US012006408B2

(12) United States Patent
Koori et al.

(10) Patent No.: US 12,006,408 B2
(45) Date of Patent: Jun. 11, 2024

(54) METAL-CARBON FIBER REINFORCED PLASTIC COMPOSITE AND METHOD FOR MANUFACTURING METAL-CARBON FIBER REINFORCED PLASTIC COMPOSITE

(71) Applicant: NIPPON STEEL CORPORATION, Tokyo (JP)

(72) Inventors: Masumi Koori, Tokyo (JP); Yasuaki Kawamura, Tokyo (JP); Kohei Ueda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 805 days.

(21) Appl. No.: 17/043,315

(22) PCT Filed: Apr. 2, 2019

(86) PCT No.: PCT/JP2019/014673
§ 371 (c)(1),
(2) Date: Sep. 29, 2020

(87) PCT Pub. No.: WO2019/194193
PCT Pub. Date: Oct. 10, 2019

(65) Prior Publication Data
US 2021/0024705 A1   Jan. 28, 2021

(30) Foreign Application Priority Data

Apr. 3, 2018 (JP) .................................. 2018-071937

(51) Int. Cl.
*C08J 5/04* (2006.01)
*B32B 15/08* (2006.01)
(Continued)

(52) U.S. Cl.
CPC ............... *C08J 5/042* (2013.01); *B32B 15/08* (2013.01); *B32B 15/18* (2013.01); *B32B 27/18* (2013.01);
(Continued)

(58) Field of Classification Search
CPC .......... B32B 7/12; B32B 7/027; B32B 5/022; B32B 5/024; B32B 5/08; B32B 5/26;
(Continued)

(56) References Cited

U.S. PATENT DOCUMENTS

2015/0030864 A1   1/2015   Takeuchi et al.

FOREIGN PATENT DOCUMENTS

| CN | 104203543 A | 12/2014 |
| JP | 2018-39247 A | 3/2018 |
| JP | 2016-150547 A | 8/2018 |

*Primary Examiner* — Camie S Thompson
(74) *Attorney, Agent, or Firm* — Birch, Stewart, Kolasch & Birch, LLP

(57) ABSTRACT

A metal-carbon fiber reinforced plastic composite comprising a metal member of a ferrous material or ferrous alloy, a resin layer provided on at least one surface of the metal member and including a thermoplastic resin, and carbon fiber reinforced plastic provided on a surface of the resin layer and including a carbon fiber material and a matrix resin having thermoplasticity, a glass transition point Tg1 or melting point Tm1 of the resin layer being higher than a glass transition point Tg2 or melting point Tm2 of the carbon fiber reinforced plastic, in which metal-carbon fiber reinforced plastic composite, an AC impedance at a frequency 1 Hz when immersing the metal-carbon fiber reinforced plastic composite in an aqueous solution containing sodium chloride in 5 mass % is $1\times10^7\Omega$ or more.

11 Claims, 5 Drawing Sheets

(51) Int. Cl.
  *B32B 15/18* (2006.01)
  *B32B 27/18* (2006.01)
  *B32B 37/10* (2006.01)
  *C08J 5/24* (2006.01)
(52) U.S. Cl.
  CPC ............... *B32B 37/10* (2013.01); *C08J 5/243* (2021.05); *B32B 2250/20* (2013.01); *B32B 2262/106* (2013.01); *B32B 2305/076* (2013.01); *B32B 2305/08* (2013.01); *B32B 2311/30* (2013.01); *B32B 2313/04* (2013.01)
(58) Field of Classification Search
  CPC ......... B32B 15/08; B32B 15/14; B32B 15/18; B32B 15/20; B32B 27/12; B32B 27/18; B32B 37/10; B32B 2250/02; B32B 2250/03; B32B 2250/20; B32B 2250/40; B32B 2555/40; B32B 2555/02; B32B 2555/06; B32B 2555/205; B32B 2555/26; B32B 2260/021; B32B 2260/046; B32B 2260/0246; B32B 2260/106; B32B 2260/14; B32B 2305/076; B32B 2305/08; B32B 2305/20; B32B 2305/54; B32B 2305/732; B32B 2311/30; B32B 2313/04; C08J 5/042; C08J 5/243; B29C 70/003; B29C 70/086; B29C 70/088; B29C 70/42; B29C 65/18; B29C 65/4815; B29C 65/486; B29C 65/5057; B29C 65/522; B29C 65/524; B29C 65/526; B29C 66/1122; B29C 66/45; B29C 66/71; B29C 66/7212; B29C 66/72321; B29C 66/73116; B29C 66/73921; B29C 66/74283; B29C 66/8322; B29C 66/91421; B29C 66/91933; B29C 66/91935; B29K 2307/04; B29K 2067/003; B29K 2077/00; B29K 2023/12; B29K 2023/06; B29K 2081/04; B29K 2071/00
  USPC .......... 428/297.4, 36.9, 113, 118, 35.8, 35.9, 428/36.4
  See application file for complete search history.

METAL-CARBON FIBER REINFORCED PLASTIC COMPOSITE AND METHOD FOR MANUFACTURING METAL-CARBON FIBER REINFORCED PLASTIC COMPOSITE

FIELD

The present invention relates to a metal-carbon fiber reinforced plastic composite and a method for manufacturing a metal-carbon fiber reinforced plastic composite.

BACKGROUND

A carbon fiber reinforced plastic comprised of carbon fiber included in a matrix to form a composite (CFRP) is light in weight and excellent in tensile strength, workability, etc. Therefore, CFRP is being widely utilized in everything from the field of consumer products to industrial applications. In the automotive industry as well, to satisfy the need for lightening the weight of car bodies so as to improve the fuel efficiency and other aspects of performance, the application of CFRP to automotive members has been studied focusing on the light weight, tensile strength, workability, etc. of CFRP.

However, if applying CFRP alone to automotive members, there is the problem that CFRP is small in compressive strength and the problem that with CFRP using a thermosetting resin for the matrix resin, brittle fracture easily occurs. For this reason, recently, development of composite materials comprised of a metal member and CFRP stacked together (to form a composite) has been underway.

To form a composite of a metal member and CFRP, the metal member and the CFRP have to be joined. As the method of joining them, in general, the method of using an epoxy resin type of thermosetting adhesive is known. However, as explained above, there is the problem that with a CFRP using a thermosetting resin for the matrix resin, brittle fracture easily occurs, so carbon fiber reinforced thermo plastics (CFRTP) using a thermoplastic resin for the matrix resin are being developed.

For example, in the following PTL 1, a method for manufacturing by injection molding a CFRTP composite comprised of a metal material, CFRTP, CFRTP matrix resin, etc. stacked together has been proposed.

CITATIONS LIST

Patent Literature

[PTL 1] Japanese Unexamined Patent Publication No. 2016-150547

SUMMARY

Technical Problem

However, the inventors discovered that depending on the conditions for joining the metal member and CFRTP, there is a possibility of the carbon fiber contacting the metal member and discovered that the phenomenon of a local cell being formed together with an electrolytic solution such as the surrounding moisture and the metal member corroding (contact corrosion between dissimilar materials) occurs. Further, the inventors discovered that in the case where the metal member is a ferrous material or ferrous alloy, since these are relatively easily corrodible materials with no stable oxide films or passive films formed at their surfaces, contact corrosion between dissimilar materials occurs more remarkably.

Therefore, the present invention was made in consideration of the above problem and has as its object to provide a metal-carbon fiber reinforced plastic composite able to keep down contact corrosion between dissimilar materials occurring due to contact of the metal member, more specifically a ferrous material or ferrous alloy, and the carbon fiber in the carbon fiber reinforced plastic.

Solution To Problem

The present invention was made based on the above such findings and has as its gist the following:

[1] A metal-carbon fiber reinforced plastic composite comprising a metal member of a ferrous material or ferrous alloy, a resin layer provided on at least one surface of the metal member and including a thermoplastic resin, and carbon fiber reinforced plastic provided on a surface of the resin layer and including a carbon fiber material and a matrix resin having thermoplasticity, a melting point $T_{m1}$ of the resin layer being higher than a melting point $T_{m2}$ of the carbon fiber reinforced plastic, in which metal-carbon fiber reinforced plastic composite, an AC impedance at a frequency 1 Hz when immersing the metal-carbon fiber reinforced plastic composite in an aqueous solution containing sodium chloride in 5 mass % is $1 \times 10^7 \Omega$ or more.

[2] The metal-carbon fiber reinforced plastic composite according to [1], wherein the thermoplastic resin contained in the resin layer is a resin different from the matrix resin.

[3] The metal-carbon fiber reinforced plastic composite according to [1] or [2], wherein a melting point $T_{m1}$ (° C.) of the resin layer and a melting point $T_{m2}$ (° C.) of the matrix resin satisfy a relationship of the following formula (1):

$$T_{m2} \leq T_{m1} - 10° C. \qquad \text{formula (1)}$$

[4] The metal-carbon fiber reinforced plastic composite according to any one of [1] to [3], wherein a thickness of the resin layer is 5 μm or more.

[5] The metal-carbon fiber reinforced plastic composite according to any one of [1] to [4], wherein the ferrous material or ferrous alloy is a plated steel material provided with a galvanized layer.

[6] The metal-carbon fiber reinforced plastic composite according to any one of [1] to [5], wherein the matrix resin includes at least one thermoplastic resin selected from the group comprising phenoxys, polycarbonates, polyethylene terephthalates, polyethylene 2,6 naphthalates, nylons, polypropylenes, polyethylenes, polyepoxy ether ketones, and polyphenylene sulfides, the resin included in the resin layer includes at least one type of thermoplastic resin selected from the group comprising polycarbonates, polyethylene terephthalates, polyethylene 2,6 naphthalates, nylons, polypropylenes, polyethylenes, polyepoxy ether ketones, and polyphenylene sulfides.

[7] The metal-carbon fiber reinforced plastic composite according to any one of [1] to [6], wherein the matrix layer includes phenoxys.

[8] A method for manufacturing a metal-carbon fiber reinforced plastic composite comprising a step of forming a resin film including a thermoplastic resin on at least one surface of a metal member made of a ferrous material or ferrous alloy, a step of arranging on at least at part of a surface on which the resin film is formed a carbon fiber reinforced plastic or a carbon fiber reinforced plastic forming prepreg containing a carbon fiber material and a matrix resin including a thermoplastic resin, and a step of hot press bonding at a heating temperature T to form a resin layer and carbon fiber reinforced plastic layer, the heating temperature T being less than a melting point $T_{m1}$ of the resin layer, the melting point $T_{m1}$ of the resin layer being higher than a melting point $T_{m2}$ of the matrix resin.

[9] A method for manufacturing a metal-carbon fiber reinforced plastic composite comprising a step of arranging a resin sheet including a thermoplastic resin on at least one surface of a metal member made of a ferrous material or ferrous alloy, a step of arranging on at least at part of a surface of the resin sheet on an opposite side to the metal member a carbon fiber reinforced plastic or a carbon fiber reinforced plastic forming prepreg containing a carbon fiber material and a matrix resin including a thermoplastic resin, and a step of hot press bonding at a heating temperature T to form a resin layer and carbon fiber reinforced plastic layer, the heating temperature T being less than a melting point $T_{m1}$ of the resin layer, the melting point $T_{m1}$ of the resin layer being higher than a melting point $T_{m2}$ of the matrix resin.

[10] The method for manufacturing a metal-carbon fiber reinforced plastic composite according to [8] or [9], wherein the heating temperature T is a melting point $T_{m2}$ of the matrix resin or more.

Advantageous Effects of Invention

As explained above, by using a thermoplastic resin having a melting point higher than the melting point of the matrix resin having thermoplasticity contained in the CFRTP, the resin layer can be rendered a state harder than the matrix resin of the CFRTP when hot pressing bonding when joining the metal member, resin layer, and CFRTP layer, so it becomes possible to keep the carbon fiber from penetrating the resin layer.

As explained above, according to the present invention, metal member, specifically, it becomes possible to suppress contact corrosion between dissimilar materials occurring due to contact between the ferrous material or ferrous alloy and the carbon fiber in the carbon fiber reinforced plastic. Even when using the relatively easily corrodible ferrous material or ferrous alloy for the metal member, it is possible to improve the corrosion resistance of the metal-carbon fiber reinforced plastic composite.

DESCRIPTION OF EMBODIMENTS

Figure 1:
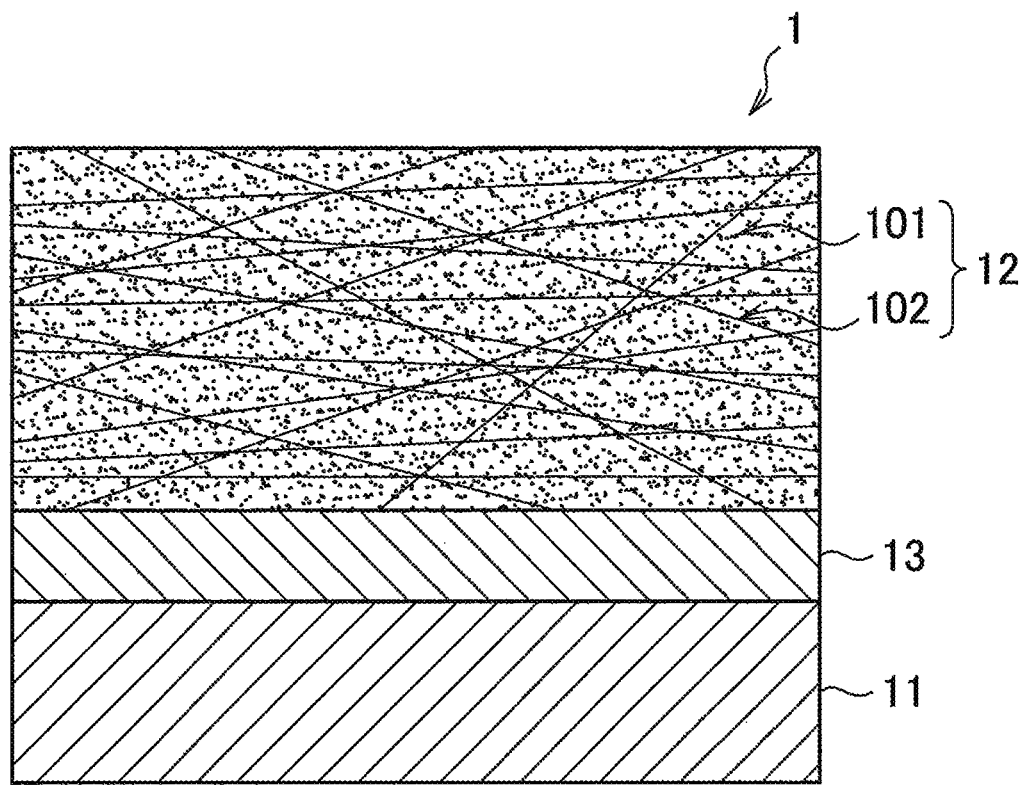
FIG. 1 is a schematic view showing a cross-sectional structure of a metal-CFRTP composite according to a first embodiment of the present invention.

Below, preferred embodiments of the present invention will be explained in detail while referring to the attached drawings. Note that, in the Description and drawings, component elements having substantially the same functions and configurations are assigned the same notations and overlapping explanations are omitted.

Background

As explained above, the inventors discovered that depending on the conditions for joining the metal member and CFRTP, a composite material in which the carbon fiber contacts the metal member results and contact corrosion between dissimilar materials where a local cell is formed with an electrolytic solution such as the surrounding moisture and the metal member is corroded occurs. For example, if using an adhesive resin to hot press bond the metal member and CFRTP to form a composite, when using an adhesive member and CFRTP where the melting point of the adhesive resin bonding the metal member and CFRTP and the melting point of the matrix resin of the CFRTP are equal, sometimes, at the time of the hot press bonding, the adhesive resin and matrix resin of the CFRTP soften and the carbon fiber in the CFRTP penetrates the softened adhesive resin. The carbon fiber penetrating the adhesive resin is sometimes present in a state contacting the metal member or a state positioned near the metal member. If there is for example moisture or another substance containing an electrolyte present at a location where such carbon fiber contacts the metal member, a local cell is formed by the carbon fiber and metal member, so the metal member, which is baser than the carbon fiber, corrodes. Even when the carbon fiber and metal member do not directly contact each other, if carbon fiber is present near the metal member, they sometimes become conductive due to the moisture etc. and the metal member corrodes. In particular, when the metal member is a ferrous material or ferrous alloy not formed on its surface with a stable oxide film or passive film, these relatively easily corrode, so contact corrosion between dissimilar materials remarkably occurs due to contact with the carbon fiber. Furthermore, in the case of a ferrous material or ferrous alloy on the surface of which a galvanized layer containing zinc, which has a sacrificial corrosion prevention action with respect to iron, a further larger potential difference easily occurs between the carbon fiber and the galvanized layer and the contact corrosion between dissimilar materials occurs more remarkably.

Therefore, the inventors came up with the idea of preventing penetration of the carbon fiber in the CFRTP into the adhesive resin at the time of hot press bonding the metal member and CFRTP to sufficiently separate the metal member and carbon fiber and thereby suppress corrosion of the metal member by a local cell formed by the metal member and carbon fiber. Specifically, they thought of providing a thermoplastic resin layer having a melting point higher than the matrix resin of the CFRTP between the metal member and CFRTP to prevent contact between the metal member and carbon fiber at the time of hot press bonding. Further, the inventors focused on the matrix resin of the CFRTP and the adhesive resin and invented a metal-carbon fiber reinforced plastic composite able to suppress corrosion of the metal member by a local cell formed by the metal member and carbon fiber. Accordingly, by preventing the metal member and carbon fiber from contacting, it is possible to sufficiently suppress contact corrosion between dissimilar materials even in the case of a metal member comprised of a relatively easily corrodible ferrous material or ferrous alloy or galvanized steel sheet, so it becomes possible to obtain a composite having an improved corrosion resistance.

Configuration of Metal-Carbon Fiber Reinforced Plastic Composite

Figure 2:
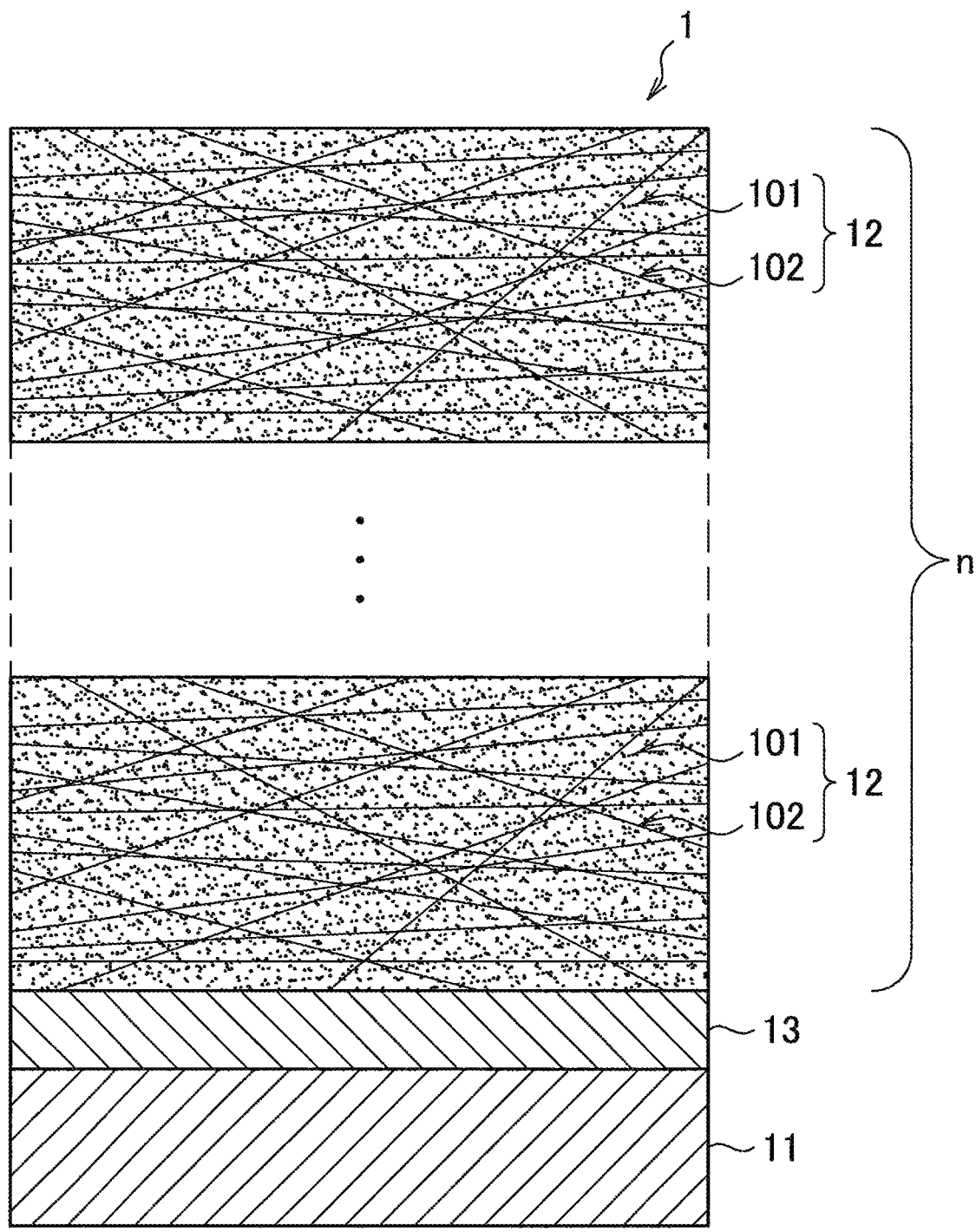
FIG. 2 is a schematic view showing a cross-sectional structure of another mode of the metal-CFRTP composite according to the same embodiment.
Figure 3:
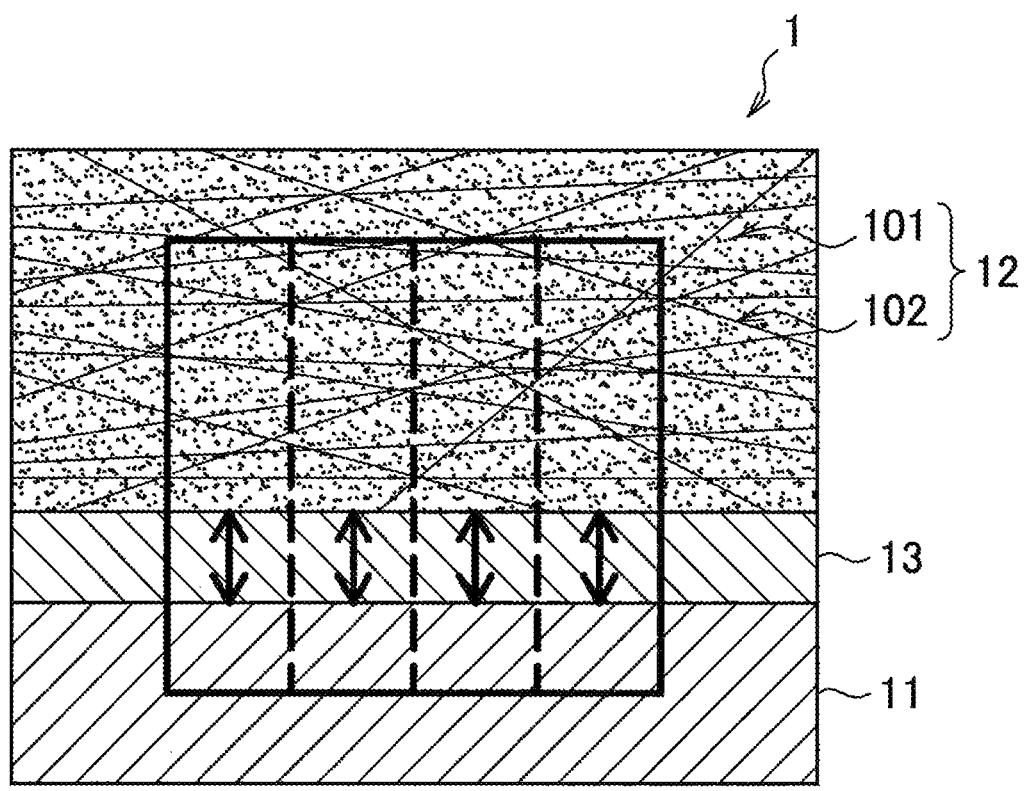
FIG. 3 is an explanatory view for explaining a method of measurement of thickness.

First, while referring to FIGS. 1 to 3, the configuration of the metal-carbon fiber reinforced plastic composite according to a first embodiment of the present invention will be explained. FIGS. 1 to 3 are schematic views showing the cross-sectional structures in the stacking direction of the metal-CFRTP composite 1 as a metal-carbon fiber reinforced plastic composite according to the present embodiment.

As shown in FIG. 1, the metal-CFRTP composite 1 is provided with a metal member 11, CFRTP layer 12, and resin layer 13. Alternatively, the metal-CFRTP composite 1 may be comprised of only a metal member 11, CFRTP layer 12, and resin layer 13. Therefore, the metal member 11 and CFRTP layer 12 may be formed into a composite through the resin layer 13. Here, "formed into a composite" means the metal member 11 and CFRTP layer 12 being joined (bonded) through the resin layer 13 for forming an integral unit. Further, "joined together" means the metal member 11, CFRTP layer 12, and resin layer 13 moving as an integral unit at the time of being worked or deformed.

In the present embodiment, the resin layer 13 is a thermoplastic resin. It is provided so as to contact the surface of at least one side of the metal member 11 whereby the metal member 11 and CFRTP layer 12 are strongly joined. However, the resin layer 13 and CFRTP layer 12 may not only be provided on just one surface of the metal member 11, but may also be provided at the two surfaces. Further, the structure may be one comprised of two metal members 11 between which a stack containing a resin layer 13 and a CFRTP layer 12 is sandwiched.

The metal-carbon fiber reinforced plastic composite 1 according to the present embodiment may further have a coating film on the CFRTP layer 12 or resin layer 13. This coating film, for example, can be formed by hand coating, spray coating, roll coating, dip coating, electrodeposition coating, powder coating, etc. While explained later, the resin layer 13 provided on the surface of the metal member 11 preferably has a thickness of 5 μm or more. Due to this, it is possible effectively prevent contact of the carbon fiber and sufficiently secure insulation ability.

The metal-CFRTP composite 1 according to the present embodiment has an AC impedance at a frequency of 1 Hz in the case of immersion in an aqueous solution containing sodium chloride in 5 mass % of $1\times10^7\Omega$ or more. To obtain a corrosion resistance improved by sufficiently suppressing contact corrosion between dissimilar materials, it is effective to have such an AC impedance at 1 Hz. If the AC impedance becomes less than $1\times10^7\Omega$, the contact corrosion between dissimilar materials is liable to be unable to be sufficiently suppressed in all cases. The AC impedance is preferably $2\times10^7\Omega$ or more, for example, $3\times10^7\Omega$ or more or $5\times10^7\Omega$ or more. Further, to sufficiently obtain electrodeposition coatability of the composite, the AC impedance should be $1\times10^9\Omega$ or less. For example, it may be $8\times10^8\Omega$ to $5\times10^8\Omega$. If the AC impedance becomes over $1\times10^9\Omega$, sometimes electrodeposition coating is not sufficiently adhered. Water, saltwater, or other corrosive factors are liable to be unable to be sufficiently prevented from penetration.

The above AC impedance is a parameter expressing the penetration resistance of a metal-carbon fiber reinforced plastic composite in an environment in which an electrolyte is present. Using this parameter, it is possible to quantitatively predict the extent of contact corrosion between dissimilar materials in a corrosive environment. Therefore, the higher the value of the AC impedance, the more effectively the contact corrosion between dissimilar materials can be suppressed. Therefore, it becomes possible to improve the corrosion resistance of the composite.

In the present invention, the AC impedance is measured as follows: First, the metal-carbon fiber reinforced plastic composite is stamped into a φ15 mm disk shape. The stamped out sample is deburred by a file to thereby prepare a sample for measurement of the AC impedance. When the metal member has plating or an electrodeposition coating film on it, exposed parts are formed at the metal member for attachment of operating electrodes before the stamping operation. Next, operating electrodes are attached to the metal member so that the CFRP layer side of the sample for measurement of the AC impedance becomes the surface contacting the electrolytic solution. At this time, silicone rubber packing is used to cover the sample for measurement of the AC impedance to adjust the contact area (measurement area) of the CFRP layer of the sample for measurement of the AC impedance and electrolytic solution to become 1.0 cm². A carbon electrode is used as the counter electrode and a silver-silver chloride electrode as the reference electrode and a 5% sodium chloride aqueous solution 100 ml with a saturated dissolved oxygen concentration (25° C.) is used as the electrolytic solution. The sample for measurement of the AC impedance is allowed to stand in the electrolytic solution for 60 minutes, then a potentiostat is used to measure the AC impedance by superposition of a 5 mV AC voltage and change of the frequency from 10 mHz to 1 kHz. Note that, in the present invention, unless otherwise specifically described, the AC impedance means the AC impedance at a frequency of 1 Hz when immersed in a 5% sodium chloride aqueous solution.

Below, component elements of the metal-CFRTP composite 1 and the rest of the configuration will be explained in detail.

Metal Member 11

The material, shape, thickness, etc. of the metal member 11 are not particularly limited so long as shaping by a press etc. is possible, but the shape is preferably a thin sheet. As the material of the metal member 11, for example, iron, aluminum, magnesium, and their alloys etc. may be mentioned. Here, as an example of the alloy, for example, a ferrous alloy (including stainless steel), Al-based alloy, Mg alloy, etc. may be mentioned. The material of the metal member 11 is preferably a ferrous material (steel material), ferrous alloy aluminum, or magnesium. Compared with other types of metal, a ferrous material or ferrous alloy with a high tensile strength is more preferable. As explained above, if the metal member 11 is a ferrous material or ferrous alloy, the surface of the member is not formed with an oxide film etc. and is relatively easily corroded, so the contact corrosion between dissimilar materials becomes more remarkable. Therefore, in a composite using a ferrous material or ferrous alloy, it is extremely effective to make the configuration one according to the present invention and suppress contact corrosion between dissimilar materials. As such a ferrous material, for example, there are ferrous materials prescribed in the Japan Industrial Standard (JIS) etc. Carbon steel, alloy steel, high strength steel, etc. used for general structures and for machine structures may be mentioned. As specific examples of such ferrous materials, cold rolled steel materials, hot rolled steel materials, hot rolled steel sheet materials used for automobile structures, high strength steel sheet materials used for working for automobiles, cold rolled steel sheet materials used for automobile structures, cold rolled high strength steel sheet materials used for working for automobiles, and high strength steel materials generally called "hot stamped materials" which are hardened at the time of hot working may be mentioned. In the case of a steel material, the composition is not particularly prescribed, but in addition to Fe and C, one or more of Mn, Si, P, Al, N, Cr, Mo, Ni, Cu, Ca, Mg, Ce, Hf, La, Zr, and Sb may be added. One or more of these added elements may be selected for obtaining the material strength and formability sought. The amounts of addition may also be suitably adjusted. Note that, if the metal member 11 is a sheet shape, it may also be shaped.

The ferrous material used as the material for the metal member 11 may be treated on its surface by any method. Here, as the surface treatment, for example, galvanization and aluminum plating, tin plating, and other various types of plating, zinc phosphate treatment, chromate treatment, chromate-free treatment, and other chemical conversion and sandblasting and other physical treatment or chemical etching and other such chemical surface roughening treatment may be mentioned, but the invention is not limited to these. Further, for the ferrous material, surfaces may be treated by several methods as described above. As the surface treatment, treatment aimed at least at imparting rustproofness is preferable.

As the metal member 11, in particular, since it is excellent in corrosion resistance, even among ferrous materials, a plated steel material treated by being plated is preferably used. As a plated steel material particularly preferable as a metal member 11, hot dip galvanized steel sheet, galvannealed steel sheet, or hot dip galvannealed steel sheet obtained by heat treating these to make Fe diffuse into the galvanized coating, electrogalvanized steel sheet, electro Zn—Ni plated steel sheet, hot dip Zn—Al alloy plated steel sheet such as hot dip Zn-5% Al alloy coated steel sheet and hot dip 55% Al—Zn alloy coated steel sheet, hot dip Zn—Al—Mg alloy plated steel sheet such as hot dip Zn-1 to 12% Al-1 to 4% Mg alloy coated steel sheet or hot dip 55% Al-Zn-0.1 to 3% Mg alloy coated steel sheet, hot dip Zn—Al—Mg—Si alloy coated steel sheet such as hot dip Zn-11% Al-3% Mg-0.2% Si alloy coated steel sheet, Ni plated steel sheet or alloyed Ni plated steel sheet obtained by alloying by heat treating these to make the Fe diffuse into the Ni plating, Al plated steel sheet, tin plated steel sheet, chrome plated steel sheet, etc. may be mentioned. Galvanized steel sheet is excellent in corrosion resistance and preferable as the metal member 11. As the metal member 11, further, a Zn—Al—Mg alloy plated steel sheet or Zn—Al—Mg—Si alloy plated steel sheet is further excellent in corrosion resistance, so is more preferable. However, as explained above, if a galvanized steel material including zinc having a sacrificial corrosion prevention action with respect to the base steel sheet contacts the carbon fiber 102 in the CFRTP layer 12, contact corrosion between dissimilar materials occurs more remarkably than when using a ferrous material as it is. This is because a large potential difference is caused between the galvanized layer and the carbon fiber 102. Therefore, in a composite using a galvanized steel material, it is extremely effective to made the configuration one according to the present invention and suppress contact corrosion between dissimilar materials.

To improve the adhesion of the CFRTP layer 12 through the resin layer 13, the surface of the metal member 11 may be treated by a primer. As the primer used for this treatment, for example, a silane coupling agent or triazine thiol derivative is preferable. As the silane coupling agent, a general known silane coupling agent, for example, γ-(2-aminoethyl) aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropylmethyl-dimethoxysilane, γ-methacryloxypropyltrimethoxysilane, γ-methacryloxypropylmethyl-dimethoxysilane, γ-methacryloxypropyltriethoxysilane, γ-methacryloxypropylmethyl-diethoxysilane, N-β-(N-vinylbenzylaminoethyl)-γ-aminopropyltrimethoxysilane, N-β-(N-vinylbenzylaminoethyl)-γ-aminopropylmethyldimethoxysilane, N-β-(N-vinylbenzylaminoethyl)-γ-aminopropyltriethoxysilane, N-β-(N-vinylbenzylaminoethyl)-γ-aminopropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, vinyltrimethoxysilane, vinylmethyldimethoxysilane, vinyltriethoxysilane, vinylmethyldiethoxysilane, octadecyl dimethyl[3-(trimethoxysilyl)propyl]ammonium chloride, octadecyl dimethyl[3-(methyldimethoxysilyl)propyl]ammonium chloride, octadecyl dimethyl[3-(triethoxysilyl)propyl] ammonium chloride, octadecyl dimethyl[3-(methyldiethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, etc. may be mentioned, but if using a silane coupling agent having a glycidyl ether group, for example, a γ-glycidoxypropyltrimethoxysilane and γ-glycidoxypropyltriethoxysilane having a glycidyl ether group, the processing adhesion of the coating film is particularly improved. Furthermore, if using a triethoxy type of silane coupling agent, the base treatment agent can be improved in storage stability. This is believed to be because triethoxysilane is relatively stable in an aqueous solution and is slow in polymerization speed. The silane coupling agent may be used as a single type or two types or more may be jointly used. As the triazine thiol derivative, 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithio1-1,3,5-triazine, etc. may be illustrated.

CFRTP Layer 12

The CFRTP layer 12 has a matrix resin 101 having thermoplasticity and carbon fiber 102 contained in and forming a composite with that matrix resin 101. Alternatively, the CFRTP layer 12 may be comprised of only a matrix resin 101 having thermoplasticity and carbon fiber 102 contained in and forming a composite with that matrix resin 101. As the CFRTP layer 12, for example, one formed using a CFRTP forming prepreg or a composite obtained by curing a matrix resin 101 containing carbon fiber 102 may be used. The CFRTP layer 12 is not limited to a single layer. For example, as shown in FIG. 2, it may be comprised of two layers or more. The thickness of the CFRTP layer 12 or the number of layers "n" of the CFRTP layer 12 in the case of making the CFRTP layer 12 from several layers may be suitably set in accordance with the objective of use. For example, the lower limit of thickness of the CFRTP layer 12 may be 0.01 mm, 0.05 mm, or 0.1 mm. On the other hand, for example, the upper limit may be 3.0 mm, 2.0 mm, or 1.0 mm. If the CFRTP layer 12 is made from several layers, the layers may be configured the same or may be different. That is, the type of resin of the matrix resin 101 forming the CFRTP layer 12 may differ for each layer so long as being a resin with a melting point $T_{m2}$ lower than the melting point $T_{m1}$ of the resin composition of the resin layer 13. Further, the type or ratio of content of the carbon fiber 102 forming the CFRTP layer 12 may differ for each layer as well.

As the matrix resin 101 used for the CFRTP layer 12, a thermoplastic resin is used. Preferably, as the resin component of the matrix resin 101, 50 parts by mass or more, 60 parts by mass or more, 70 parts by mass or more, 80 parts by mass or more, or 90 parts by mass or more of thermoplastic resin with respect to 100 parts by mass of the resin component is contained. Alternatively, the matrix resin 101 may contain only a thermoplastic resin. The type of the thermoplastic resin able to be used for the matrix resin 101 is not particularly limited, but, for example, one or more types selected from a phenoxy resin, polyolefin and its acid-modified forms, polystyrene, polymethyl methacrylate, AS resin, ABS resin, polyethylene terephthalate or polybutylene terephthalate or other thermoplastic aromatic polyester, polycarbonate, polyimide, polyamide, polyamideimide, polyether imide, polyether sulfone, polyphenylene ether and its modified forms, polyphenylene sulfide, polyoxymethylene, polyarylate, polyether ketone, polyether ether ketone, polyether ketoneketone, nylon, etc. can be used. Note that, a "thermoplastic resin" also includes resins able to form a cross-linked product in a later explained second cured state. By using a thermoplastic resin as the matrix resin 101, it becomes possible to eliminate the problem of bending work not able to be performed due to the brittleness occurring when using a thermosetting resin for the CFRP.

Here, if the matrix resin 101 contains a thermoplastic resin, the problems when using a thermosetting resin for the above-mentioned matrix resin of the CFRP, that is, the problem when bending is not possible since the CFRP layer has brittleness and further the problem that the tact time becomes longer. However, usually, a thermoplastic resin is relatively high in viscosity when melted and cannot impregnate carbon fiber 102 in the state of low viscosity such as an epoxy resin or other thermosetting resin before heat curing, so compared with the thermosetting resin, the ability to impregnate the carbon fiber 102 becomes inferior. For this reason, sometimes it is difficult to raise the density (VF: volume fraction) of the carbon fiber contained in the CFRTP layer 12 such as when using a thermosetting resin as the matrix resin 101. For example, if using the thermosetting resin of an epoxy resin as the matrix resin 101, it is easy to make the VF 60 vol % or so, but if using polypropylene or nylon or other thermoplastic resin as the matrix resin 101, sometimes VF can be limited to 50 vol % or so. Further, if using polypropylene or nylon or another thermoplastic resin, sometimes it is not possible for the CFRTP layer to be given a sufficiently high heat resistance such as when using an epoxy resin or other thermosetting resin.

To eliminate such problems when using a thermoplastic resin, it is preferable to use a phenoxy resin as the matrix resin 101. A phenoxy resin is very similar to an epoxy resin in molecular structure, so has the same extent of heat resistance as an epoxy resin. Further, the adhesion with the resin layer 13 or carbon fiber 102 becomes excellent. Furthermore, by adding an epoxy resin or other such curable component to a phenoxy resin and copolymerizing them, it is possible to obtain a so-called partially curable resin. By using such a partially curable resin as the matrix resin 101, it is possible to obtain a matrix resin excellent in impregnability into the carbon fiber 102. Furthermore, by causing the curable component in the partially curable resin to thermally set, it is possible to keep the matrix resin 101 in the CFRTP layer 12 from melting or softening when exposed to a high temperature like a usual thermoplastic resin. The amount of addition of the curable component in the phenoxy resin should be suitably determined considering the impregnability into the carbon fiber 102 and the brittleness, tact time, and workability of the CFRTP layer 12 etc. In this way, by using a phenoxy resin as the matrix resin 101, it is possible to add and control the curable component with a high degree of freedom.

Note that, for example, the surface of the carbon fiber 102 is often treated by a sizing agent good in affinity with an epoxy resin. A phenoxy resin is extremely similar in structure to an epoxy resin, so by using a phenoxy resin as the matrix resin 101, it is possible to use a sizing agent for epoxy resin use as it is. For this reason, it is possible to raise the cost competitiveness.

Further, in thermoplastic resins, a phenoxy resin is provided with good formability and is excellent in adhesion with carbon fiber 102 or the resin layer 13. In addition, it is possible to use an acid anhydride or isocyanate compound, caprolactam, etc. as the cross-linking agent, so it is possible to give similar properties as a high heat resistant thermosetting resin after shaping. Accordingly, in the present embodiment, as the resin component of the matrix resin 101, it is preferable to use a solidified form or cured form of a resin composition containing 50 parts by mass or more of phenoxy resin with respect to 100 parts by mass of the resin component. By using such a resin composition, it becomes possible to strongly join the CFRTP layer 12 and resin layer 13. The resin composition more preferably includes 55 parts by mass or more of phenoxy resin in 100 parts by mass of the resin component. For example, it may include 60 parts by mass or more, 65 parts by mass or more, 70 parts by mass or more, 75 parts by mass or more, 80 parts by mass or more, 85 parts by mass or more, 90 parts by mass or more, or 95 parts by mass or more. Alternatively, the matrix resin 101 may contain only a phenoxy resin. The mode of the adhesive resin composition may, for example, be made a powder, a varnish or other liquid, or a film or other solid.

Note that, the content of the phenoxy resin, as explained below, can be measured using infrared spectroscopy (IR). If analyzing the ratio of content of phenoxy resin from the resin composition covered by the infrared spectroscopy, the transmission method or ATR reflection method or other general method of infrared spectroscopy can be used for measurement.

For example, a sharp knife etc. is used to cut out the CFRTP layer 12. As much as possible, the fibers are removed by tweezers etc. to obtain a sample of the resin composition from the CFRTP layer 12 for analysis. In the case of the transmission method, KBr powder and the powder of the resin composition for analysis are homogeneously mixed by a mortar etc. while crushing them to prepare a thin film for use as a sample. In the case of the ATR reflection method, in the same way as the transmission method, powders may be homogeneously mixed by a mortar while crushing them to prepare tablets to prepare samples or monocrystalline KBr tablets (for example diameter 2 mm×thickness 1.8 mm) may be scored at their surfaces by a file etc. and sprinkled with powder of the resin composition for analysis for use as samples. Whichever the method, it is important to measure the background at the KBr by itself before mixing with the resin for analysis. The IR measurement apparatus used may be a general one on the commercial market, but as precision, an apparatus having a precision of analysis enabling differentiation of absorbance in 1% unit and wavenumber in 1 cm$^{-1}$ unit is preferable. For example, FT/IR-6300 made by JASCO Corporation etc. may be mentioned.

If investigating the content of the phenoxy resin, there are absorption peaks of the phenoxy resin at for example 1450 to 1480 cm$^{-1}$, near 1500 cm$^{-1}$, near 1600 cm$^{-1}$, etc. For this reason, the content can be calculated based on the strengths of the absorption peaks.

A "phenoxy resin" is a linear polymer obtained by a condensation reaction of a dihydric phenol compound and epihalohydrin or a polyaddition reaction of a dihydric phenol compound and bifunctional epoxy resin and is a non-crystalline thermoplastic resin. A phenoxy resin can be obtained by a conventionally known method in a solution or without a solvent and can be used in the form of any of a powder, varnish, or film. The average molecular weight of the phenoxy resin is, in terms of the mass average molecular weight (Mw), for example, 10,000 to 200,000 in range, preferably 20,000 to 100,000 in range, more preferably 30,000 to 80,000 in range. By making the Mw of the phenoxy resin (A) 10,000 or more in range, it is possible to increase the strength of a shaped part. This effect is further enhanced by making the Mw 20,000 or more, furthermore 30,000 or more. On the other hand, by making the Mw of the phenoxy resin 200,000 or less, it is possible to make the work efficiency and workability better. This effect is further enhanced by making the Mw 100,000 or less, furthermore 80,000 or less. Note that, in the Description, Mw is the value obtained by measurement by gel permeation chromatography (GPC) and conversion using a standard polystyrene calibration line.

The hydroxyl equivalent of the phenoxy resin (g/eq) used in the present embodiment is, for example, 50 to 1000 in range, but is preferably 50 to 750 in range, more preferably 50 to 500 in range. By making the hydroxyl equivalent of the phenoxy resin 50 or more, the hydroxyl groups decrease, whereby the water absorption falls, so the mechanical properties of the cured resin can be improved. On the other hand, by making the hydroxyl equivalent of the phenoxy resin 1,000 or less, the hydroxyl groups can be kept from being decreased, so the affinity with the resin layer 13 can be improved and the mechanical properties of the metal-CFRTP composite 1 can be improved. This effect is further enhanced if making the hydroxyl equivalent 750 or less and furthermore 500 or less.

Further, the glass transition temperature (Tg) of the phenoxy resin, for example, is suitably 65° C. to 150° C. in range, but is preferably 70° C. to 150° C. in range. If Tg is 65° C. or more, it is possible to secure shapeability while keeping the fluidity of the resin from becoming too large, so it is possible to sufficiently secure the thickness of the resin layer 13. On the other hand, if Tg is 150° C. or less, the melt viscosity becomes lower, so the carbon-reinforcing fiber base material can be easily impregnated without any voids or other defects and the joining process can be made lower in temperature. Note that, in the Description, the Tg of the resin is a value obtained by using a differential scanning calorimeter under conditions of a temperature rise of 10° C./min at 20 to 280° C. in range of temperature and calculated by the peak value of a second scan.

The phenoxy resin is not particularly limited so long as satisfying the above physical properties, but as preferable ones, bisphenol A type phenoxy resin (for example, available as Phenotohto YP-50, Phenotohto YP-50S, and Phenotohto YP-55U made by Nippon Steel & Sumikin Chemical Co., Ltd.), bisphenol F type phenoxy resin (for example, available as Phenotohto FX-316 made by Nippon Steel & Sumikin Chemical Co., Ltd.), a copolymer type phenoxy resin of bisphenol A and bisphenol F (for example, available as YP-70 made by Nippon Steel & Sumikin Chemical Co., Ltd.) or resins other than the above mentioned phenoxy resins such as a brominated phenoxy resin or phosphorus-containing phenoxy resin, sulfonic group-containing phenoxy resin, or other special phenoxy resin (for example, Phenotohto YPB-43C, Phenotohto FX293, YPS-007, etc. made by Nippon Steel & Sumikin Chemical Co., Ltd.), etc. may be mentioned. These resins may be used as single type alone or as two types or more mixed together.

The thermoplastic resin used as the resin component of the matrix resin 101 preferably has a melt viscosity of 3,000 Pa·s or less anywhere at 160 to 250° C. in range of temperature, more preferably has a melt viscosity of 90 Pa·s to 2,900 Pa·s in range, still more preferably has a melt viscosity of 100 Pa·s to 2,800 Pa·s in range. By making the melt viscosity at 160 to 250° C. in range of temperature 3,000 Pas or less, the fluidity at the time of melting becomes better and voids and other defects become harder to form at the CFRTP layer 12. On the other hand, if the melt viscosity is 90 Pa·s or less, the molecular weight of the resin composition becomes too small. If the molecular weight is small, the resin becomes brittle and the metal-CFRTP composite 1 ends up falling in mechanical strength.

Cross-Linkable Resin Composition

A resin composition containing a phenoxy resin (below, also referred to as a "phenoxy resin (A)") may, for example, have an acid anhydride, isocyanate, caprolactam, etc. blended into it as a cross-linking agent to thereby obtain a cross-linkable resin composition (that is, cured form of resin composition). The cross-linkable resin composition is made to cross-link by a reaction utilizing the secondary hydroxyl groups contained in the phenoxy resin (A) to thereby improve the heat resistance of the resin composition, so becomes advantageous for application to a member used in a higher temperature environment. For cross-linking utilizing the secondary hydroxyl groups of the phenoxy resin (A), it is preferable to use a cross-linkable resin composition containing a cross-linkable curable resin (B) and cross-linking agent (C). As the cross-linkable curable resin (B), for example, an epoxy resin etc. may be used, but the invention is not particularly limited to this. By using such a cross-linkable resin composition, a cured form (cross-linked cured form) of a second cured state with a Tg of the resin composition improved more greatly than in the case of the phenoxy resin (A) alone is obtained. The Tg of the cross-link cured form of the cross-linkable resin composition is, for example, 160° C. or more, preferably 170° C. to 220° C. in range.

In the cross-linkable resin composition, as the cross-linkable curable resin (B) mixed in the phenoxy resin (A), a bifunctional or more epoxy resin is preferable. As the bifunctional or more epoxy resin, a bisphenol A type epoxy resin (for example, available as Epotohto YD-011, Epotohto YD-7011, and Epotohto YD-900 made by Nippon Steel & Sumikin Chemical Co., Ltd.), bisphenol F type epoxy resin (for example, available as Epotohto YDF-2001 made by Nippon Steel & Sumikin Chemical Co., Ltd.), diphenyl ether type epoxy resin(for example, available as YSLV-80DE made by Nippon Steel & Sumikin Chemical Co., Ltd.), tetramethyl bisphenol F type epoxy resin (for example, available as YSLV-80XY made by Nippon Steel & Sumikin Chemical Co., Ltd.), bisphenol sulfide type epoxy resin (for example, available as YSLV-120TE made by Nippon Steel & Sumikin Chemical Co., Ltd.), hydroquinone type epoxy resin (for example, available as Epotohto YDC-1312 made by Nippon Steel & Sumikin Chemical Co., Ltd.), phenol novolac type epoxy resin (for example, available as Epotohto YDPN-638 made by Nippon Steel & Sumikin Chemical Co., Ltd.), o-cresol novolac type epoxy resin (for example, Epotohto YDCN-701, Epotohto YDCN-702, Epotohto YDCN-703, and Epotohto YDCN-704 made by Nippon Steel & Sumikin Chemical Co., Ltd.), aralkyl naphthalene diol novolac type epoxy resin (for example, available as ESN-355 made by Nippon Steel & Sumikin Chemical Co., Ltd.), triphenyl methane type epoxy resin (for example, available as EPPN-502H made by Nippon Kayaku Co., Ltd.), etc. may be illustrated, but the invention is not limited to these. Further, these epoxy resins may be used as single type alone or used as two types or more mixed together.

Further, the cross-linkable curable resin (B) is not particularly limited in sense, but a crystalline epoxy resin is preferable. A crystalline epoxy resin having a melting point of 70° C. to 145° C. in range and a melt viscosity at 150° C. of 2.0 Pa.s or less is more preferable. By using a crystalline epoxy resin exhibiting such melting characteristics, it is possible to lower the melt viscosity of the cross-linkable resin composition used as the resin composition and possible to improve the adhesion of the CFRTP layer 12. If the melt viscosity is over 2.0 Pa·s, the shapeability of the cross-linkable resin composition may fall and the homogeneity of the metal-CFRTP composite 1 may fall.

As a crystalline epoxy resin suitable as a cross-linkable curable resin (B), for example, Epotohto YSLV-80XY, YSLV-70XY, YSLV-120TE, and YDC-1312 made by Nippon Steel & Sumikin Chemical Co., Ltd., YX-4000, YX-4000H, YX-8800, YL-6121H, YL-6640, etc. made by Mitsubishi Chemical Corporation, HP-4032, HP-4032D, HP-4700, etc. made by DIC Corporation, NC-3000 made by Nippon Kayaku Co., Ltd., etc. may be mentioned.

The cross-linking agent (C) forms ester bonds with the secondary hydroxyl groups of the phenoxy resin (A) to thereby three-dimensionally cross-link the phenoxy resin (A). For this reason, unlike strong cross-linking such as curing of the thermosetting resin, it is possible to reverse the cross-linking by a hydrolysis reaction, so it becomes possible to easily peel apart the metal member 11 and CFRTP layer 12. Therefore, it becomes possible to recycle the metal member 11.

As the cross-linking agent (C), an acid anhydride is preferable. The acid anhydride is solid at ordinary temperature. If is not particularly limited so long as not having sublimation ability, but from the viewpoint of imparting heat resistance to the metal-CFRTP composite 1 and reactivity, an aromatic acid anhydride having two or more acid anhydrides reacting with the hydroxyl groups of the phenoxy resin (A) is preferable. In particular, an aromatic compound having two acid anhydride groups such as pyromellitic anhydrides is suitably used since it becomes higher in cross-linking density and is improved in heat resistance compared with a combination of trimellitic anhydride and hydroxyl groups. Among aromatic acid dianhydrides, for example, 4,4'-oxydiphthalic acid and ethylene glycol bisanhydrotrimellitate, 4,4'-(4,4'-isopropylidene diphenoxy) diphthalic anhydride and other such aromatic acid dianhydrides having compatibility with a phenoxy resin and epoxy resin have large effects of improvement of the Tg and are more preferable. In particular, aromatic acid dianhydrides having two acid anhydride groups such as pyromellitic anhydride, for example, are improved in cross-linking density and improved in heat resistance compared with anhydrous phthalic acid having only one acid anhydride group, so are preferably used. That is, an aromatic acid dianhydride is good in reactivity since it has two acid anhydride groups and gives a cross-linked and cured form of sufficient strength for mold release in a short molding time and produces four carboxyl groups by an esterification reaction with the secondary hydroxyl groups in the phenoxy resin (A), so the final cross-linking density can be made higher.

The reaction of the phenoxy resin (A), the epoxy resin used as the cross-linkable curable resin (B), and the cross-linking agent (C) is cross-linked and cured by an esterification reaction of the secondary hydroxyl groups in the phenoxy resin (A) and the acid anhydride groups of the cross-linking agent (C), and further by the reaction of the carboxyl groups produced by this esterification reaction and the epoxy groups of the epoxy resin. Due to the reaction of the phenoxy resin (A) and cross-linking agent (C), it is possible to obtain a cross-linked form of the phenoxy resin, but due to the copresence of the epoxy resin, the melt viscosity of the resin composition is made to fall, so impregnation in the material deposited on (resin layer 13) can be improved, the cross-linking reaction is promoted, the cross-linking density is improved, the mechanical strength is improved, and other excellent characteristics are exhibited.

Note that, in the cross-linkable resin composition, the epoxy resin used as the cross-linkable curable resin (B) is copresent, but the phenoxy resin (A) of the thermoplastic resin is the main component. It is believed that an esterification reaction between its secondary hydroxyl groups and the acid anhydride groups of the cross-linking agent (C) takes precedence. That is, the reaction between the acid anhydride used as the cross-linking agent (C) and the epoxy resin used as the cross-linkable curable resin (B) takes time (reaction speed is slow), so the reaction between the cross-linking agent (C) and the secondary hydroxyl groups of the phenoxy resin (A) takes preference. Next, the cross-linking density rises due to the reaction between the cross-linking agent (C) remaining due to the previous reaction or the residual carboxyl groups derived from the cross-linking agent (C) and the epoxy resin. For this reason, unlike a resin composition having the epoxy resin of the thermosetting resin as a main component, the cross-linked cured form obtained by the cross-linkable resin composition is a thermoplastic resin and is excellent in storage stability.

In the cross-linkable resin composition utilizing cross-linking of the phenoxy resin (A), preferably the cross-linkable curable resin (B) is contained in 5 parts by mass to 85 parts by mass in range with respect to 100 parts by mass of the phenoxy resin (A). The content of the cross-linkable curable resin (B) with respect to 100 parts by mass of the phenoxy resin (A) is more preferably 9 parts by mass to 83 parts by mass in range, more preferably 10 parts by mass to 80 parts by mass in range. By making the content of the cross-linkable curable resin (B) 85 parts by mass or less, it is possible to shorten the curing time of the cross-linkable curable resin (B), so not only can the strength required for mold release be easily obtained in a short time, but also the recycling ability of the CFRTP layer 12 is improved. This effect is further enhanced by making the content of the cross-linkable curable resin (B) 83 parts by mass or less, furthermore, 80 parts by mass or less. On the other hand, by making the content of the cross-linkable curable resin (B) 5 parts by mass or more, the effect of improvement of the cross-linking density by addition of the cross-linkable curable resin (B) becomes easier to obtain, the cross-linked cured form of the cross-linkable resin composition can easily realize a Tg of 160° C. or more, and the fluidity becomes excellent. Note that, the content of the cross-linkable curable resin (B) can be measured in the same way for the peaks derived from the epoxy resin by the method using the above-mentioned infrared spectroscopy to measure the content of the cross-linkable curable resin (B).

The amount of the cross-linking agent (C) is usually an amount of 0.6 mole to 1.3 moles in range of acid anhydride groups with respect to 1 mole of secondary hydroxyl groups of the phenoxy resin (A), preferably an amount of 0.7 mole to 1.3 moles in range, more preferably 1.1 moles to 1.3 moles in range. If the amount of acid anhydride groups is 0.6 mole or more, the cross-linking density becomes higher, so the mechanical properties and heat resistance become excellent. This effect is further enhanced by making the amount of acid anhydride groups 0.7 mole or more, furthermore 1.1 moles or more. If the amount of acid anhydride groups is 1.3 moles or less, the unreacted acid anhydrides or carboxyl groups can be kept from having a detrimental effect on the curing characteristics or cross-linking density. For this reason, it is preferable to adjust the amount of the cross-linkable curable resin (B) in accordance with the amount of cross-linking agent (C). Specifically, for example, due to the epoxy resin used as the cross-linkable curable resin (B), for causing a reaction of the carboxyl groups formed by action of the secondary hydroxyl groups of the phenoxy resin (A) and the acid anhydride groups of the cross-linking agent (C), the amount of the epoxy resin is preferably made an equivalent ratio with the cross-linking agent (C) of 0.5 mole to 1.2 moles in range. Preferably, the equivalent ratio of the cross-linking agent (C) and the epoxy resin is 0.7 mole to 1.0 mole in range.

If mixing in a cross-linking agent (C) together with the phenoxy resin (A) and cross-linkable curable resin (B), it is possible to obtain a cross-linkable resin composition, but it is also possible to further include an accelerator (D) as a catalyst so that the cross-linking reaction is reliably performed. The accelerator (D) is solid at ordinary temperature. It is not particularly limited so long as not having a sublimation ability, but, for example, triethylene diamine or other tertiary amine, 2-methyl imidazole, 2-phenyl imidazole, 2-phenyl-4-methyl imidazole, or other imidazoles, triphenyl phosphine or other organic phosphines, tetraphenylphosphonium tetraphenylborate or other tetraphenylborates, etc. may be mentioned. These accelerators (D) may be used as single types alone or as two types or more jointly used. Note that, if making the cross-linkable resin composition a fine powder and using the powder coating method using an electrostatic field so as to deposit it on the reinforcing fiber base material to form the matrix resin 101, as the accelerator (D), it is preferable to use an imidazole-based latent catalyst of a catalyst activation temperature of 130° C. or more and which is solid at an ordinary temperature. If using an accelerator (D), the amount of the accelerator (D) is preferably 0.1 part by mass to 5 parts by mass in range with respect to 100 parts by mass of the total amounts of the phenoxy resin (A), cross-linkable curable resin (B), and cross-linking agent (C).

The cross-linkable resin composition is solid at ordinary temperature. Its melt viscosity is preferably, in terms of a lowest melt viscosity, comprised of a lower limit value of melt viscosity in a temperature region of 160 to 250° C. in range, of 3,000 Pa·s or less, more preferably 2,900 Pa·s or less, still more preferably 2,800 Pa·s or less. By making the lowest melt viscosity in a temperature region of 160 to 250° C. in range 3,000 Pa.s or less, at the time of thermocompression bonding by hot pressing etc., it is possible to make the cross-linkable resin composition sufficiently impregnate the material to be deposited on and possible to suppress the formation of voids and other defects in the CFRTP layer 12, so the metal-CFRTP composite 1 is improved in mechanical properties. This effect is further enhanced by making the lowest melt viscosity at the temperature region of 160 to 250° C. in range 2,900 Pa·s or less, furthermore 2,800 Pa·s or less.

The resin composition for forming the matrix resin 101 (including cross-linkable resin composition) may contain, in a range not detracting from the adhesion and physical properties, for example, a natural rubber, synthetic rubber, elastomer, etc. or various types of inorganic fillers, solvents, extender pigments, coloring agents, antioxidants, UV blockers, flame retardants, flame retardant aids, and other additives.

The thermoplastic resin used as the matrix resin 101 is selected in accordance with the thermal properties of the thermoplastic resin used for the resin layer 13. Specifically, as the matrix resin 101, a resin with a melting point $T_{m2}$ lower than the melting point $T_{m1}$ of the resin composition contained in the resin layer 13 is used. That is, the matrix resin 101 is selected so that the melting point $T_{m1}$ of the resin layer 13 becomes higher than the melting point $T_{m2}$ of the CFRTP layer 12. If satisfying such a relationship, at the time of hot press bonding for forming the composite according to the present invention, even if the CFRTP layer 12 softens and carbon fiber 102 flows inside the CFRTP layer 12, the resin layer 13 will not completely soften and the resin layer 13 will be maintained in a state harder than the matrix resin 101 of the CFRTP layer 12. In other words, according to the present invention, at the heating temperature at the time of the hot press bonding (for example 180 to 250° C.), the resin layer 13 has a hardness able to prevent carbon fiber 102 from penetrating to the resin layer 13. For this reason, the carbon fiber 102 can be prevented from passing through the resin layer 13 and the metal member 11 and carbon fiber 102 can be kept prevented from contacting. As a result, contact corrosion between dissimilar materials is effectively suppressed. Further, to obtain such an effect, the heating temperature T at the time of hot press bonding has to be made less than the melting point $T_{m1}$ of the resin layer 13. By setting such a temperature, the CFRTP layer 12 can be softened and the resin layer 13 can be made to suitably soften to an extent where the carbon fiber 102 does not pass through it. Due to this, the metal member 11, resin layer 13, and CFRTP layer 12 can be sufficiently joined, the carbon fiber 102 can be kept from passing through the resin layer 13, the contact corrosion between dissimilar materials can be suppressed, and a composite according to the present invention excellent in corrosion resistance can be obtained. To obtain good workability, the heating temperature T at the time of the hot press bonding is preferably the melting point $T_{m2}$ of the matrix resin 101 or more.

Melting Point $T_m$

The matrix resin 101 is preferably one having a melting point $T_{m2}$ where the bondability with the resin layer 13 is maintained at the hot press bonding temperature. Note that, the melting points $T_{m1}$ and $T_{m2}$ of the resins in the Description, that is, the resin layer 13 and matrix resin 101, are values obtained using a differential scan calorimeter for measurement under conditions of a rise of temperature of 10° C./min at 20 to 280° C. in range of temperature and calculated by the peak value of a second scan. Further, when a noncrystalline thermoplastic resin where the melting point $T_{m1}$ or $T_{m2}$ cannot be observed, a generally known rule of thumb may be utilized to suitably set the melting point $T_{m1}$ or $T_{m2}$. The rule of thumb utilized may be suitably selected in accordance with the properties of the thermoplastic resin used for the matrix resin 101 or the combination with the thermoplastic resin able to be used as the resin layer 13. When the melting point $T_{m1}$ of the thermoplastic resin used as a resin layer 13 is relatively low, the melting point $T_{m2}$ of the matrix resin 101 for which a noncrystalline thermoplastic resin with a melting point which cannot be observed may, for example, be set using one rule of thumb of the relationship of melting point (K)=glass transition point (K)×1.4. Further, for example, if the matrix resin 101 is a noncrystalline thermoplastic resin which exhibits fluidity at a relatively high temperature and for which the melting point cannot be observed, the melting point $T_{m2}$ of the matrix resin 101 may be set using the relationship of the melting point (K)=glass transition point (K)×1.5.

Fiber Density

The density of carbon fiber in the CFRTP (VF: Volume Fraction) is a factor affecting the strength. In general, the higher the VF, the higher the strength of the CFRTP. In the present embodiment, the VF of the CFRTP layer 12 is not particularly limited, but may be 20 vol % or more, 30 vol % or more, 40 vol % or more, or 50 vol % or more and, further, 75 vol % or less, 70 vol % or less, or 65 vol % or less. From the viewpoint of the balance between the adhesion of the matrix resin and carbon fiber and the strength of the CFRTP, the VF of the CFRTP layer 12 is preferably 50 vol % to 65 vol %. Further, as explained above, if using a phenoxy resin for the matrix resin 101 of the CFRTP layer 12, an over 50 vol % VF can be easily achieved.

Carbon Fiber 102

Regarding the type of the carbon fiber 102, for example, either of a PAN based one or pitch based one can be used. It may be selected in accordance with the object or application. Further, as the carbon fiber 102, the above-mentioned fiber may be used as single type alone or a plurality of types may be used together.

As the carbon fiber base material of the CFRTP layer 12, for example, a nonwoven fabric base material using chopped fiber or a cloth material using continuous filaments, a unidirectional reinforcing fiber base material (UD material), etc. can be used. From the viewpoint of the reinforcing effect, as the carbon fiber base material, use of a cloth material or UD material is preferable.

Resin Layer 13

The resin layer 13 is one containing a thermoplastic resin. It is provided on the surface of the metal member 11 and joins the metal member 11 and the CFRTP layer 12. The resin layer 13 can be obtained by, for example, using a powder, a varnish or other liquid, or a sheet or other solid. Further, the resin composition contained in the resin layer 13 is preferably a resin having good adhesion with the metal member 11. The resin composition used as the resin layer 13 is not particularly limited, but, for example, one or more of a phenoxy resin, polyolefin and its acid-modified form, polystyrene, polymethyl methacrylate, AS resin, ABS resin, polyethylene terephthalate or polybutylene terephthalate or other thermoplastic aromatic polyester, polycarbonate, polyimide, polyamide, polyamideimide, polyether imide, polyether sulfone, polyphenylene ether and its modified forms, polyphenylene sulfide, polyoxymethylene, polyarylate, polyether ketone, polyether ether ketone, polyether ketoneketone, nylon, etc. can be used. If the matrix resin 101 of the CFRTP layer 12 is a phenoxy resin, from the viewpoint of the difference of the melting points and the hardness, a polyamide (for example, polyamide 66) is preferably used as the resin layer 13.

Thickness of Resin Layer 13

In a metal-CFRTP composite 1 according to the present embodiment, the thickness of the resin layer 13 is preferably made 5 µm or more. If the thickness of the resin layer 13 is 5 µm or more, adhesion between the metal member 11 and CFRTP layer 12 is sufficiently maintained. On top of this, contact of the carbon fiber 102 and metal member 11 at the time of hot press bonding can be effectively suppressed. Further, the thickness of the resin layer 13 may be 6 µm or more, 7 µm or more, 8 µm or more, or 9 µm or more. On the other hand, the thickness of the resin layer 13 may be 50 µm or less from the viewpoint of the workability and cost. For example, it may be 40 µm or less, 30 µm or less, or 20 µm or less. As the range of thickness of the resin layer 13, 5 µm to 50 µm is preferable, 7 µm to 25 µm is more preferable, and 9 µm to 20 µm is still more preferable. Note that, to more sufficiently secure workability, in accordance with the application, the thickness of the resin layer 13 may be made less than 10 µm.

Note that, the thicknesses of the metal member 11, CFRTP layer 12, and resin layer 13 may be measured in the following way based on the cross-section method of the optical methods of JIS K 5600-1-7, Section 5.4. That is, without having a detrimental effect on the sample, a sample is buried using an ordinary temperature curing resin packed without gap. For example, Low Viscosity Epomount 27-777 made by Refine Tec Ltd. is used as the main agent and 27-772 is used as the curing agent to bury the sample. The sample is cut by a cutting machine at the location to be observed so as to become parallel with the thickness direction to expose a cross-section and is polished using abrasive paper of a count prescribed by JIS R 6252 or 6253 (for example, #280, #400, or #600) to prepare an observed surface. When using an abrasive, a suitable grade of diamond paste or similar paste is used for polishing to prepare the observed surface. Further, in accordance with need, buffing may be performed to smooth the surface of the sample to a state able to withstand observation.

A microscope provided with a lighting system suitable for giving optimum contrast to the image and having sufficient precision (for example, BX51 made by Olympus etc.) was used to observe a sample by a suitable size of field. Note that, the size of a field may be changed to enable the thicknesses of the metal member 11, CFRTP layer 12, and resin layer 13 to be confirmed. (For example, if the thickness of the CFRTP layer 12 is 1 mm, the size of the field may be changed to one where that thickness can be confirmed.) For example, when measuring the thickness of the resin layer 13, a field of observation is divided into four equal parts such as shown in FIG. 3, the thickness of the resin layer 13 is measured at the center part in the width direction at each fraction, and the average thickness is made the thickness at the field of observation. For the fields of observation, five different locations are selected. Each field of observation is divided into four equal parts. The thicknesses of the fractions are measured and the average value is calculated. The adjoining fields of observation should be separated by 3 cm or more. The average values of the five locations may be further averaged and the value made the thickness of the resin layer 13. Further, the thicknesses of the metal member 11 and CFRTP layer 12 as well may be measured in the same way as measurement of the thickness of the above resin layer 13.

The resin layer 13 may contain, in a range not detracting from the adhesion and physical properties, for example, a natural rubber, synthetic rubber, elastomer, etc. or various types of inorganic fillers, solvents, extender pigments, coloring agents, antioxidants, UV blockers, flame retardants, flame retardant aids, and other additives.

As explained above, for the resin composition of the resin layer 13 and matrix resin 101, resins having hardnesses whereby the carbon fiber 102 in the CFRTP layer 12 will not penetrate the resin layer 13 while the metal member 11, CFRTP layer 12, and resin layer 13 are bonded well at the time of hot press bonding of the resin layer 13 and the CFRTP. For this reason, as explained previously, as the resin layer 13, a resin having a melting point $T_{m1}$ higher than the melting point $T_{m2}$ of the matrix resin 101 is used. By using a resin satisfying this relationship, the carbon fiber 102 in the CFRTP layer 12 can be prevented from penetrating the resin layer 13 and the carbon fiber 102 and the metal member 11 can be prevented from contact. As a result, corrosion of the metal member 11 due to contact of the carbon fiber 102 and the metal member 11 is suppressed. Further, preferably, the difference of the melting point $T_{m1}$ of the resin composition of the resin layer 13 and the melting point $T_{m2}$ of the matrix resin 101 may be 5° C. or more. More preferably, from the viewpoint of suppressing penetration of the carbon fiber 102 into the resin layer 13, for the resin layer 13 and matrix resin 101, resins with a melting point $T_{m1}$ of the resin composition of the resin layer 13 and a melting point $T_{m2}$ of the matrix resin 101 satisfying the relationship of the following formula (1) are used:

$$T_{m2} \leq T_{m1} - 10° \text{ C.} \qquad \text{formula (1)}$$

That is, the difference of the melting point $T_{m1}$ of the resin composition of the resin layer 13 and the melting point $T_{m2}$ of the matrix resin 101 is preferably 10° C. or more. For example, the difference may be 15° C. or more or 20° C. or more. Note that, in this Description, the melting points $T_{m1}$ and $T_{m2}$ are values obtained using a differential scan calorimeter for measurement under conditions of a rise of temperature of 10° C./min at 20 to 280° C. in range of temperature and calculated by the peak value of a second scan. Further, when resin is a noncrystalline thermoplastic resin and the melting point cannot be observed, for convenience, the melting point is defined as the melting point (K)=glass transition point (K)×1.4.

In the metal-CFRTP composite 1, the resin composition forming the resin layer 13 is preferably made a resin different from the matrix resin 101 of the CFRTP layer 12. The "different resin" referred to here means the resin with the highest content among all of the resin components, that is, the main component, differs. To obtain a sufficient difference of the melting points. To secure a sufficient hardness of the resin layer at the time of hot press bonding, it is preferable to select a phenoxy resin and polyamide resin as the combination of the CFRTP layer 12 and resin layer 13.

Method for Manufacturing Metal-CFRTP Composite 1

Figure 4:
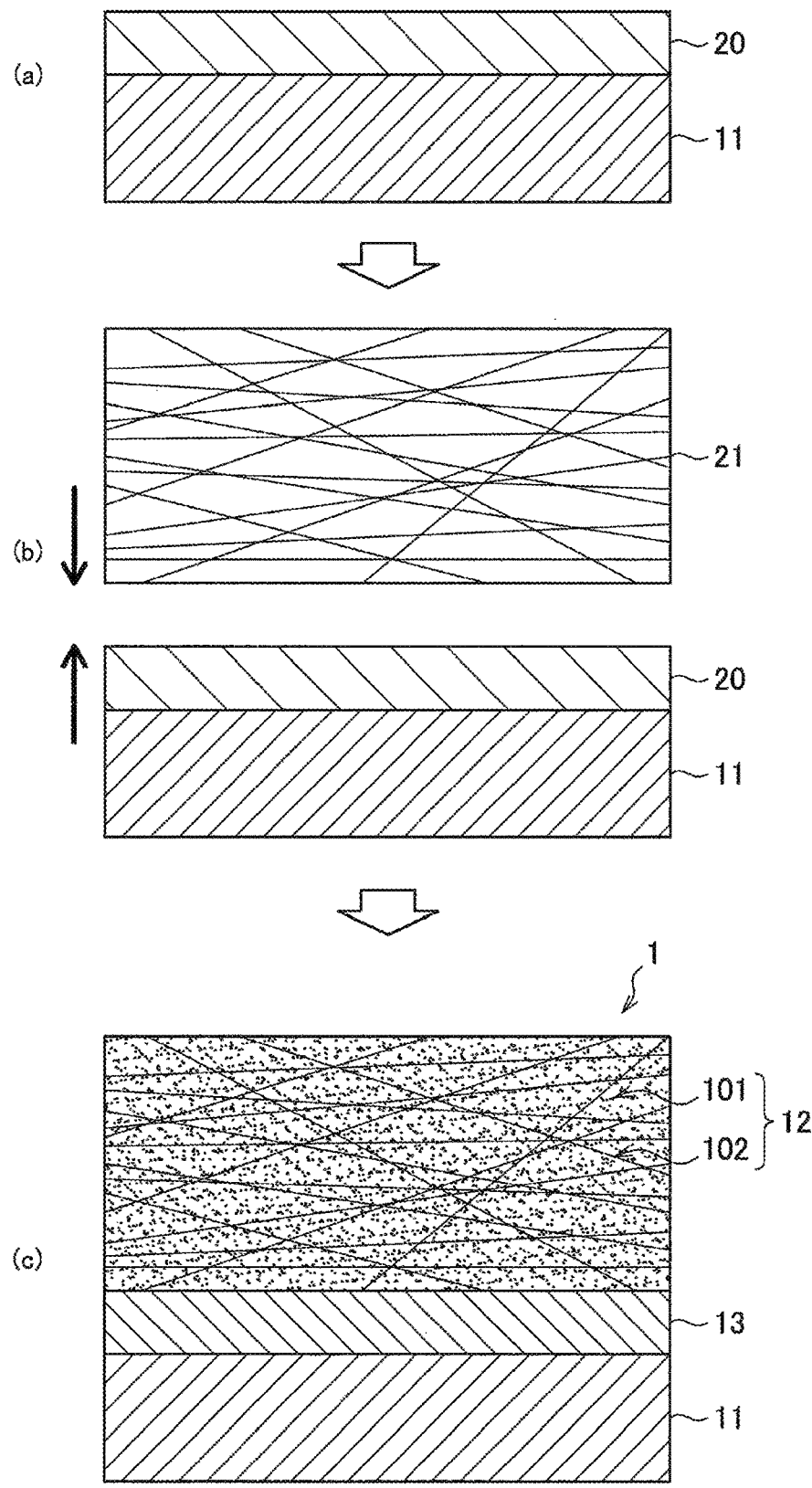
FIG. 4 is an explanatory view showing one example of a process for manufacturing the metal-CFRTP composite according to the same embodiment.
Figure 5:
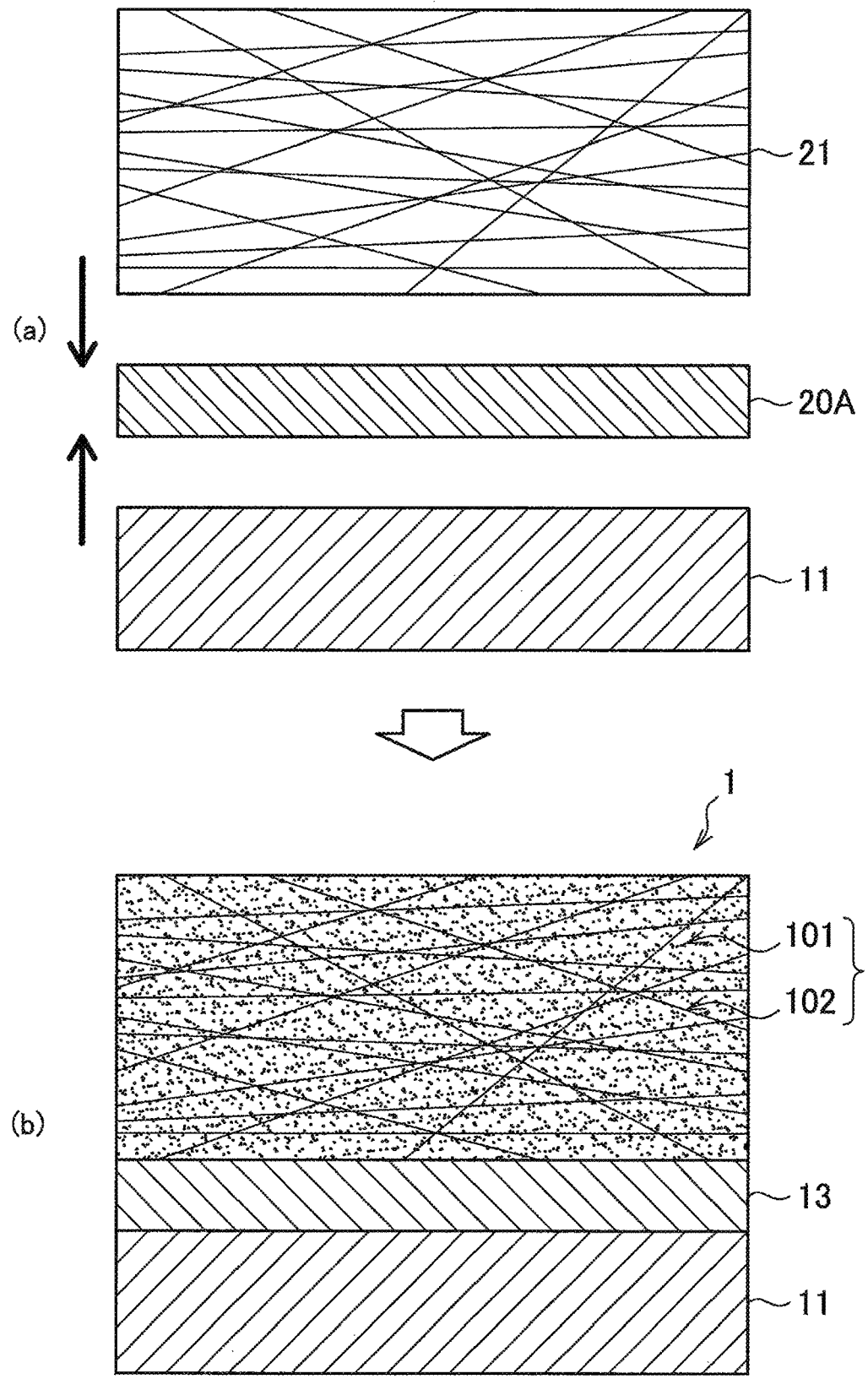
FIG. 5 is an explanatory view showing one example of a process for manufacture of another mode of the metal-CFRTP composite according to the same embodiment.

Above, the configuration of the metal-CFRTP composite 1 used as the metal-carbon fiber reinforced plastic composite according to the present embodiment was explained in detail, but next, referring to FIG. 4 and FIG. 5, a method for manufacturing the metal-CFRTP composite 1 according to the present embodiment will be explained. FIG. 4 and FIG. 5 are explanatory views showing an example of the process for manufacturing the metal-CFRTP composite 1.

The metal-CFRTP composite 1 is obtained by joining CFRTP worked to a desired shape (or the precursor CFRTP forming prepreg 21) and the metal member 11 (ferrous material or ferrous alloy) by a resin film 20 or resin sheet 20A. After the hot press bonding, the joined CFRTP becomes the CFRTP layer 12 and the resin film 20 or resin sheet 20A becomes the resin layer 13. In the present invention, the resin layer 13 and matrix resin 101 of the CFRTP layer 12 are selected so that the melting point $T_{m1}$ of the resin layer 13 becomes higher than the melting point $T_{m2}$ of the CFRTP layer 12. As the method for joining the metal member 11 and the CFRTP by a resin film 20 or resin sheet 20A to form a composite, for example, the following Method 1 or the Method 2 may be used.

Method 1

In the Method 1, a resin film 20 (something forming the resin layer 13) is formed on the surface of a metal member 11, then the CFRTP or CFRTP forming prepreg 21 forming the CFRTP layer 12 is stacked on it and hot press bonded.

In this method, for example, as shown in FIG. 4(a), at least one surface of a metal member 11 is coated with a powder or liquid or sheet-shaped resin composition to form a resin layer 20. Note that, it is also possible to coat the powder resin composition in a solvent, then coat it. Note that, with this method, it is possible to form the resin film 20 not at the metal member 11 side, but at the CFRTP side or the CFRTP forming prepreg side forming the CFRTP layer 12, but here, the case of forming the resin film 20 at the metal member 11 side will be used as an example for the explanation.

Next, as shown in FIG. 4(b), at the side of the metal member 11 where the resin film 20 is formed, a CFRTP forming prepreg 21 forming the CFRTP layer 12 is placed superposed on it to form a stack comprised of the metal member 11, resin sheet 20, and CFRTP forming prepreg 21 stacked in that order. Note that, in FIG. 4(b), instead of the CFRTP forming prepreg 21, CFRTP may also be stacked, but at this time, the bonding surface of the CFRTP may, for example, be roughened by blasting etc. or activated by plasma treatment, corona treatment, etc. Next, this stack is heated and pressed to, as shown in FIG. 4(c), obtain the metal-CFRTP composite 1.

In this Method 1, the method of coating of the resin 20 forming the resin layer 13 is not particularly limited. In the case of using a resin composition of a viscous liquid, it may be coated by a method of discharge from slit nozzles or circular nozzles, brush coating, blade coating, flat coating, or another generally known method. When using a powder resin composition dissolved in a solvent, a generally known coating method such as brush coating, spray coating, a bar coater, discharge coating from various shapes of nozzles, a die coater, curtain coating, roll coating, injection coating, screen printing, or other known method can be employed. If using a sheet-shaped resin composition, the method of bonding the sheet-shaped resin composition can be bonding by hand, a robot, or other known method. In particular, the resin layer 20 formed by powder coating is easily melted since the resin composition is comprised of fine particles and voids are easily eliminated since the resin film 20 has suitable porosity. Further, the resin composition wets the surface of the metal member 11 well at the time of hot press bonding the CFRTP or CFRTP forming prepreg 21, so a deaeration step such as with varnishing is not necessary. Defects due to insufficient wettability such as the formation of voids such as seen in sheets hardly ever occur. The resin film 20 may be coated on the entire surface of the metal sheet or may be partially coated on only the location where the CFRTP is bonded.

In the Method 1, in FIG. 4(a), the two surfaces of the metal member 11 are formed with resin films 20. In FIG. 4(b), on the respective two resin films 20, CFRTP forming prepregs 21 (or CFRTPs) may be stacked. Further, the CFRTP forming prepreg 21 (or CFRTPs) forming each CFRTP layer 12 is not limited to a single layer and may also be comprised of several layers (see FIG. 2). Further, two or more metal members 11 may be used and stacked so as to sandwich the CFRTP forming prepregs 21 (or CFRTPs) forming the CFRTP layers 12.

Method 2

In the Method 2, the sheet-shaped resin composition (resin sheet 20A) forming the resin layer 13 and the CFRTP or CFRTP forming prepreg 21 forming the CFRTP layer 12 are stacked on the metal member 11 and hot press bonded.

In this Method 2, for example, as shown in FIG. 5(a), at least one surface of a metal member 11 has a resin sheet 20A obtained by forming a resin composition into a sheet and a CFRTP forming prepreg 21 forming the CFRTP layer 12 placed superposed on it to form a stack comprised of the metal member 11, resin sheet 20A, and CFRTP forming prepreg 21 stacked in that order. Note that, in FIG. 5(a), instead of the CFRTP forming prepreg 21, it is also possible to stack a CFRTP, but at this time, the bonding surface of the CFRTP may, for example, be roughened by blasting etc. or activated by plasma treatment, corona treatment, etc. Next, this stack is heated and pressed to, as shown in FIG. 5(b), obtain the metal-CFRTP composite 1.

In the Method 2, in FIG. 5(a), the two surfaces of the metal member 11 may have the resin sheet 20A and CFRTP forming prepreg 21 (or CFRTPs) stacked on them. Further, the CFRTP forming prepreg 21 (or CFRTPs) forming the CFRTP layer 12 is not limited to a single layer and may be comprised of several layers as well (see FIG. 2). Further, two or more metal members 11 may be used and stacked so as to sandwich the resin sheet 20A and CFRTP forming prepreg 21 (or CFRTPs) forming the CFRTP layer 12.

Hot Press Bonding Conditions

The hot press bonding conditions for forming a composite of the metal member 11, resin film 20 or resin sheet 20A, and the CFRTP forming prepreg 21 (or CFRTP) forming the CFRTP layer 12 in the methods explained above will be explained in detail below. Note that, in the present invention, by selecting the resin layer 13 and matrix resin 101 satisfying the relationship of the melting point such as explained above, even if the CFRTP layer softens and melts and the carbon fiber 102 can flow in the hot press bonding step, since the underlying resin layer 13 is harder than the matrix resin 101, it acts as a barrier layer and can effectively prevent the carbon fiber 102 from passing through the resin layer 13 and contacting the metal member 11.

Hot Press Bonding Temperature

The hot press bonding temperature T is less than the melting point $T_{m1}$ of the resin layer 13. If the hot press bonding temperature T is in such a temperature range, it becomes possible to suppress penetration of the carbon fiber 102 in the CFRTP layer 12 into the resin layer 13. Further, the hot press bonding temperature T is preferably the melting point $T_{m2}$ of the matrix resin 101 or more for obtaining excellent workability. More preferably, the hot press bonding temperature T preferably satisfies the following formula (2):

$$T_{m2}+2° C.<T\leq T_{m1}-5° C. \quad \text{formula (2)}$$

By the hot press bonding temperature T satisfying the formula (2), the effect is obtained that it becomes harder for carbon fiber 102 to penetrate the resin layer 13 and it becomes harder for the carbon fiber 102 to contact the metal member 11. At this time, the hot press bonding temperature T is preferably less than the decomposition temperature of the matrix resin 101. The hot press bonding temperature T may be suitably determined in accordance with the types of resin of the matrix resin 101 in the CFRTP layer 12 and the resin layer 13, but for example may be made 180° C. or more or 220° C. or more, more preferably 270° C. or less or 250° C. or less. When respectively using a phenoxy resin and polyamide resin for the matrix resin 101 of the CFRTP layer 12 and the resin layer 13, the hot press bonding temperature T should be made 235 to 255° C. in range, for example, may be made 240° C.

Hot Press Bonding Pressure

The pressure at the time of the hot press bonding is, for example, preferably 3 MPa or more, more preferably 3 MPa to 5 MPa in range. If the pressure exceeds the upper limit, excessive pressure ends up being applied, so there is a possibility of deformation and damage being caused. Further, if below the lower limit, impregnation into the carbon fiber 102 becomes poor.

Hot Press Bonding Time

Regarding the hot press bonding time, if at least 3 minutes or more, sufficient hot press bonding is possible. 5 minutes to 20 minutes in range is preferable.

Note that, in the hot press bonding step, the press molding machine may be used to shape a metal member 11, resin sheet 20A, and CFRTP forming prepreg 21 (or CFRTP) forming a CFRTP layer 12 by composite molding. The composite molding is preferably performed by a hot press, but it is also possible to set a material preheated in advance to a predetermined temperature quickly in a low temperature press molding machine to work it.

Pre-Treatment Steps

When manufacturing the metal-CFRTP composite 1, as a pre-treatment step bonding the metal member 11 and CFRTP by a resin composition, the metal member 11 is preferably degreased. For the degreasing method, a general known method such as the method of using a solvent to wipe it off, the method of rinsing, washing using an aqueous solution or cleaner containing a surfactant, and heating to evaporate off the oil component, alkali degreasing, etc. may be used. As the degreasing method of the metal member 11, alkali degreasing is in general use industrially and is high in degreasing effect, so is preferable. Treating the dies for release and removing deposits on the surface of the metal member 11 (removal of contamination) are more preferably performed. With the exception of steel sheets with extremely high bondability such as TFS (tin free steel), usually, unless the steel sheet or other metal member 11 on which rust preventing oil etc. is deposited is degreased to restore the bonding strength, a sufficient bonding strength is difficult to obtain. Therefore, by pretreating the metal member 11 as explained above, the metal-CFRTP composite 1 can easily be given a high bonding strength. Regarding the need for degreasing, this may be judged by joining a metal member concerned to a CFRTP concerned in advance without a degreasing step using a resin composition concerned to form an integral unit and measuring the bonding strength.

Post Treatment Steps

In the post treatment steps for the metal-CFRTP composite 1, in addition to coating, the composite is drilled or coated with an adhesive for bonding, etc. for bolting or riveting or other mechanical joining with other members.

Effect of Present Embodiment

According to the above-mentioned embodiment, a metal-CFRTP composite 1 comprised of a metal member 11 and a CFRTP layer 12 strongly bonded through a resin layer 13 is provided. Such a metal-CFRTP composite 1 suppresses contact corrosion between dissimilar materials between the metal member 11 and the carbon fiber 102 in the CFRTP layer 12. In particular, if the metal member 11 is an easily corrodible ferrous material or ferrous alloy, contact corrosion between dissimilar materials becomes more problematical, so the present embodiment is extremely effective. Further, the metal-CFRTP composite 1 of the present embodiment is increased in insulation ability by the resin layer 13 having a 5 μm or more thickness and can more effectively suppress contact corrosion between dissimilar materials. Further, a thermoplastic resin is used as the matrix resin of the CFRTP layer 12, so it becomes possible to make the CFRTP plastically deform. As a result, it becomes possible to integrally work the metal-CFRTP composite 1 into a shape. Further, according to the above-mentioned embodiment, it becomes possible to obtain a metal-CFRTP composite 1 provided with an electrodeposition coating film.

EXAMPLES

Below, examples will be used to further specifically explain the present invention, but the present invention is not limited to these examples.

Preparation of Metal Sheet

Steel of a composition comprising C: 0.131 mass %, Si: 1.19 mass %, Mn: 1.92 mass %, P: 0.009 mass %, S: 0.0025 mass %, Al: 0.027 mass %, N: 0.0032 mass %, and a balance of Fe and impurities was hot rolled, pickled, then cold rolled to obtain a thickness 1.0 mm cold rolled steel sheet. Next, the prepared cold rolled steel sheet was annealed by a continuous annealing apparatus under conditions giving a peak sheet temperature of 820° C. The gas atmosphere in the annealing furnace of the annealing step was made an $N_2$ atmosphere containing 1.0 vol % of $H_2$. The prepared cold rolled steel sheet will be referred to as "CR". Further, the prepared cold rolled steel sheet was hot dip galvanized by a coating step after annealing in an annealing step of a continuous hot dip coating apparatus having an annealing step under conditions giving a peak sheet temperature of 820° C. The gas atmosphere in the annealing furnace of the annealing step was made an $N_2$ atmosphere containing 1.0 vol % of $H_2$. Four types of compositions of the coating bath at the coating step of Zn-0.2% Al (referred to as "GI"), Zn-0.09% Al (referred to as "GA"), Zn-1.5% Al-1.5% Mg (referred to as "Zn—Al—Mg"), Zn-11% Al-3% Mg-0.2% Si (referred to as "Zn—Al—Mg—Si") were used to obtain coated steel sheets. Note that, the steel sheet obtained using a hot dip coating bath of Zn-0.09% Al coating (GA) was obtained by dipping it in the hot dip coating bath, pulling the steel sheet out from the coating bath while blowing $N_2$ gas from slit nozzles to wipe off the sheet by gas, adjusting the amount of deposition of the coating solution, then heating by an induction heater at a sheet temperature of 480° C. to cause alloying and make Fe in the steel sheet diffuse in the coating layer. The amount of deposition of coating of the coated steel sheet was made 45 g/m² for GA and was made 60 g/m² for coating other than GA. The four types of metal sheets were degreased by the alkali degreasing agent "Fine Cleaner E6404" made by Nihon Parkerizing Co., Ltd. Note that, when the prepared five types of metal sheets were measured for tensile strength, in each case the strengths were 980 MPa or more.

Resin Film Forming Step

As the raw materials of the resin layers, polyamide 66, polyamide 6, polyamide 6/66 copolymer, and polyamide 6/66/12 copolymer were used and resin films using the respective resins or resin sheets using polyamide 66 were formed. Below, the method for forming the resin films or resin sheets will be explained.

Polyamide 66 Resin Film (a)

The polyamide 66 TPS® N66NC (melting point=260° C.) made by Toray Plastics Precision Co., Ltd. was dissolved in hexafluoroisopropanol to a solids concentration (N.V.) of 20 wt %. This was coated on the prepared metal sheet by a bar coater and made to dry at 80° C. to make the solvent evaporate and therefore form a polyamide 66 resin film (a) of a thickness described in Tables 1 to 3 (1 μm, 5 μm, 10 μm, 20 μm, 50 μm) on the metal sheet.

Polyamide 6 Resin Film (b)

The polyamide 6 base grade 1020 (melting point=220° C.) made by Ube Industries Ltd. was dissolved in hexafluoroisopropanol to a solids concentration (N.V.) of 20 wt %. This was coated on the prepared metal sheet by a bar coater and made to dry at 80° C. to make the solvent evaporate and therefore form a 10 μm polyamide 6 resin film (b) on the metal sheet.

Polyamide 6/66 Copolymer Resin Film (c)

The polyamide 6/66 copolymer base grade 5033 (melting point=196° C.) made by Ube Industries Ltd. was dissolved in hexafluoroisopropanol to a solids concentration (N.V.) of 20 wt %. This was coated on the prepared metal sheet by a bar coater and made to dry at 80° C. to make the solvent evaporate and therefore form a 10 μm polyamide 6/66 copolymer resin film (c) on the metal sheet.

Polyamide 6/66/12 Copolymer Resin Film (d)

The polyamide 6/66/12 copolymer base grade 6434 (melting point=188° C.) made by Ube Industries Ltd. was dissolved in hexafluoroisopropanol to a solids concentration (N.V.) of 20 wt %. This was coated on the prepared metal sheet by a bar coater and made to dry at 80° C. to make the solvent evaporate and therefore form a 10 μm polyamide 6/66/12 copolymer resin film (d) on the metal sheet.

Polyamide 66 Resin Sheet (e)

The polyamide 66 TPS® N66NC (melting point=260° C.) made by Toray Plastics Precision Co., Ltd. was pressed by a press machine heated to 280° C. at 3 MPa for 3 minutes to prepare a thickness 50 μm polyamide 66 resin sheet (e).

Preparation of CFRTP Prepregs

Next, four types of CFRTP prepregs forming the CFRTP layers were prepared by the following method.

Preparation of Phenoxy Resin CFRTP Prepreg (A)

A bisphenol A type phenoxy resin "Phenotohto YP-50S" (glass transition temperature=83° C.) made by Nippon Steel & Sumikin Chemical Co., Ltd. was crushed and graded to obtain an average particle size D50 of 80 μm. The powder was powder coated on a reinforcing fiber base made of carbon fiber (cloth material: IMS60 made by Toho Tenax Co., Ltd.) in an electrostatic field under conditions of a charge of 70 kV and sprayed air pressure of 0.32 MPa. After that, the sample was heated to melt in an oven at 170° C. for 1 minute to heat the resin to melt and prepare a thickness approximately 0.6 mm phenoxy resin CFRTP prepreg (A). Note that, for the average particle size of the crushed and graded phenoxy resin, a laser diffraction and scattering type particle size distribution measuring apparatus (Microtrack MT3300EX, made by Nikkiso Co., Ltd.) was used to measure the particle size when the cumulative volume became 50% based on the volume. The melting point of the prepared phenoxy resin CFRTP prepreg (A) was for convenience made 225° C. (498K) using the previously explained formula of the melting point (K)=glass transition point (K)×1.4.

Preparation of Polyamide 6/66 Copolymer CFRTP Prepreg (B)

The polyamide 6/66 copolymer base grade 5033 (melting point=196° C.) made by Ube Industries Ltd. was pressed by a press machine heated to 180° C. at 3 MPa for 3 minutes to prepare a thickness 100 μm nylon resin sheet. This nylon resin sheet and a plain weave reinforcing fiber base material made of carbon fiber (cloth material: SA-3203 made by Sakai Ovex Co., Ltd.) were alternately laid to obtain a stack. This stack was pressed by a press machine heated to 220° C. by 3 MPa for 3 minutes to prepare a thickness about 0.6 mm nylon resin CFRTP prepreg (B).

Preparation of Polyamide 6/66 Copolymer CFRTP Prepreg (C)

The polyamide 6/66 copolymer base grade 5034 (melting point=192° C.) made by Ube Industries Ltd. was pressed by a press machine heated to 180° C. at 3 MPa for 3 minutes to prepare a thickness 100 μm nylon resin sheet. This nylon resin sheet and a plain weave reinforcing fiber base material made of carbon fiber (cloth material: SA-3203 made by Sakai Ovex Co., Ltd.) were alternately laid to obtain a stack. This stack was pressed by a press machine heated to 220° C. by 3 MPa for 3 minutes to prepare a thickness about 0.6 mm nylon resin CFRTP prepreg (C).

Preparation of Polyamide 6/66/12 Copolymer CFRTP Prepreg (D)

The polyamide 6/66/12 copolymer base grade 6434 (melting point=188° C.) made by Ube Industries Ltd. was pressed by a press machine heated to 180° C. at 3 MPa for 3 minutes to prepare a thickness 100 μm nylon resin sheet. This nylon resin sheet and a plain weave reinforcing fiber base material made of carbon fiber (cloth material: SA-3203 made by Sakai Ovex Co., Ltd.) were alternately laid to obtain a stack. This stack was pressed by a press machine heated to 220° C. by 3 MPa for 3 minutes to prepare a thickness about 0.6 mm nylon resin CFRTP prepreg (D).

Preparation of Metal-CFRTP Composite Sample

Next, metal sheets or metal sheets on the surfaces of which resin films were formed or on the surfaces of which resin sheets were arranged and CFRTP prepregs were used in the combinations shown in Tables 1 to 3 to prepare metal-CFRTP composites. In more detail, prepared CFRTP prepregs were placed over metal sheets on which resin films were formed. A press machine having flat dies heated to predetermined temperatures described in Tables 1 to 3 was used for pressing the composites at 3 MPa for 3 minutes to prepare metal-CFRTP composite samples provided with resin layers (a) to (e) and CFRTP layers (A) to (D). In Sample No. 10 alone, the prepared prepreg was placed on a metal sheet on which the resin sheet (e) was stacked and was pressed in the same way as above to prepare a metal-CFRTP composite sample. For the metal-CFRTP composites of No. 17 to No. 21, resin layers were not placed on the metal sheets or resin sheets were not arranged and CFRTP prepregs were placed on the metal sheets and pressed in the same way as above to prepare metal-CFRTP composites. The obtained metal-CFRTP composites were measured for thicknesses based on the cross-sectional method of the optical method of JIS K 5600-1-7, Section 5.4. The thicknesses of the CFRTP layer were 0.5 mm in all cases. The thicknesses of the resin layers were the same as the resin films formed. Note that, the densities of the carbon fibers of the CFRTP prepregs used were 55 vol % in all cases.

TABLE 1

| | | CFRTP layer | | | Resin layer | | | Hot press bonding temp. °C. | Evaluation | | | |
|---|---|---|---|---|---|---|---|---|---|---|---|---|
| Sample no. | Metal member | Type of matrix resin | Melting point °C. | Thickness mm | Type of resin layer | Melting point °C. | Thickness μm | | AC impedance Ω | Corrosion resistance Cycles | Press formability Limit R (mmR) | Remarks |
| 1 | GA | A | 225 | 0.5 | a | 260 | 10 | 240 | Good | 30 | 10 | Inv. ex. |
| 2 | GA | C | 192 | 0.5 | c | 196 | 10 | 194 | Good | 21 | 10 | Inv. ex. |
| 3 | GA | D | 188 | 0.5 | c | 196 | 10 | 190 | Good | 21 | 10 | Inv. ex. |
| 4 | GA | C | 192 | 0.5 | b | 220 | 10 | 210 | Good | 27 | 10 | Inv. ex. |
| 5 | GA | B | 196 | 0.5 | b | 220 | 10 | 210 | Good | 27 | 10 | Inv. ex. |
| 6 | GA | A | 225 | 0.5 | a | 260 | 1 | 240 | Good | 21 | 5 | Inv. ex. |
| 7 | GA | A | 225 | 0.5 | a | 260 | 5 | 240 | Good | 24 | 10 | Inv. ex. |
| 8 | GA | A | 225 | 0.5 | a | 260 | 20 | 240 | Good | 45 | 20 | Inv. ex. |
| 9 | GA | A | 225 | 0.5 | a | 260 | 50 | 240 | Good | 60 | 25 | Inv. ex. |
| 10 | GA | A | 225 | 0.5 | e | 260 | 50 | 240 | Good | 60 | 25 | Inv. ex. |
| 11 | CR | A | 225 | 0.5 | a | 260 | 10 | 240 | Good | 15 | 10 | Inv. ex. |
| 12 | GI | A | 225 | 0.5 | a | 260 | 10 | 240 | Good | 30 | 10 | Inv. ex. |
| 13 | GA | A | 225 | 0.5 | a | 260 | 10 | 270 | Poor | 18 | 10 | Comp. ex. |
| 14 | GA | A | 225 | 0.5 | a | 260 | 10 | 220 | Good | 27 | >30 | Inv. ex. |
| 15 | CR | A | 225 | 0.5 | — | — | — | 240 | Poor | 10 | 5 | Comp. ex. |
| 16 | GA | A | 225 | 0.5 | — | — | — | 240 | Poor | 15 | 5 | Comp. ex. |
| 17 | GI | A | 225 | 0.5 | — | — | — | 240 | Poor | 15 | 5 | Comp. ex. |
| 18 | GA | A | 225 | 0.5 | b | 220 | 10 | 240 | Poor | 15 | 10 | Comp. ex. |
| 19 | GA | B | 196 | 0.5 | d | 188 | 10 | 210 | Poor | 15 | 10 | Comp. ex. |

TABLE 2

| | | CFRTP layer | | | Resin layer | | | Hot press bonding temp. °C. | Evaluation | | | |
|---|---|---|---|---|---|---|---|---|---|---|---|---|
| Sample no. | Metal member | Type of matrix resin | Melting point °C. | Thickness mm | Type of resin layer | Melting point °C. | Thickness μm | | AC impedance Ω | Corrosion resistance Cycles | Press formability Limit R (mmR) | Remarks |
| 20 | Zn—Al—Mg | A | 225 | 0.5 | a | 260 | 10 | 240 | Good | 60 | 10 | Inv. ex. |
| 21 | Zn—Al—Mg | A | 225 | 0.5 | — | — | — | 240 | Poor | 30 | 5 | Comp. ex. |

TABLE 3

| | | CFRTP layer | | | Resin layer | | | Hot press bonding temp. °C. | Evaluation | | | |
|---|---|---|---|---|---|---|---|---|---|---|---|---|
| Sample no. | Metal member | Type of matrix resin | Melting point °C. | Thickness mm | Type of resin layer | Melting point °C. | Thickness μm | | AC impedance Ω | Corrosion resistance Cycles | Press formability Limit R (mmR) | Remarks |
| 22 | Zn—Al—Mg—Si | A | 225 | 0.5 | a | 260 | 10 | 240 | Good | 90 | 10 | Inv. ex. |
| 23 | Zn—Al—Mg—Si | A | 225 | 0.5 | — | — | — | 240 | Poor | 60 | 5 | Comp. ex. |

Measurement of AC Impedance

The AC impedance was measured in the following way. First, the obtained samples were stamped into φ15 mm disk shapes. The stamped out samples were deburred by a file to thereby prepare measurement-use samples. When samples had plating layers, exposed parts were formed at the steel materials for attachment of operating electrodes before the stamping operation. Next, operating electrodes are attached to the metal member so that the CFRP layer side of the sample for measurement of the AC impedance becomes the surface contacting the electrolytic solution. At this time, silicone rubber packing is used to cover the sample for measurement of the AC impedance to adjust the contact area (measurement area) of the CFRP layer of the sample for measurement of the AC impedance and electrolytic solution to become 1.0 cm$^2$. A carbon electrode is used as the counter electrode and a silver-silver chloride electrode as the reference electrode and a 5% sodium chloride aqueous solution 100 ml with a saturated dissolved oxygen concentration is used as the electrolytic solution. The sample for measurement of the AC impedance was allowed to stand in the electrolytic solution for 60 minutes, then a potentiostat was used to measure the AC impedance by superposition of a 5 mV AC voltage and change of the frequency from 10 mHz to 1 kHz. In Tables 1 to 3, cases with an AC impedance at 1 Hz of $1 \times 10^7 \Omega$ or more were evaluated as "good" while other cases were evaluated as "poor". Note that, in all of the samples, the AC impedance at 1 Hz was $1 \times 10^9 \Omega$ or less.

Evaluation

Corrosion Resistance

A composite sample comprised of a width 70 mm×length 150 mm metal sheet on which a resin layer is superposed and a width 50 mm×length 100 mm CFRTP pressed onto the center was degreased, conditioned at its surface, treated by zinc phosphate, then coated by electrodeposition. The degreasing was performed by immersion for 5 minutes in the degreaser "Fine Cleaner E6408" made by Nihon Parkerizing Co., Ltd. under 60° C. conditions. The degreased composite sample was conditioned at its surface by immersion in "Prepalene X" made by Nihon Parkerizing Co., Ltd. for 5 minutes under 40° C. conditions. After that, the sample was immersed in the zinc phosphate treatment agent "Palbond L3065" made by Nihon Parkerizing Co., Ltd. for 3 minutes under 35° C. conditions to thereby treat it by zinc phosphate. After the treatment by zinc phosphate, the sample was rinsed and dried in a 150° C. atmosphere oven. After that, the electrodeposition coating "Power Float 1200" made by Nipponpaint Co., Ltd. was coated by electrodeposition to 15 μm and baked in a 170° C. atmosphere oven for 20 minutes to obtain a sample for use. Due to the electrodeposition coating, only the metal part at which no CFRTP was bonded was coated.

The prepared sample was used for a cycle corrosion test (CCT). The CCT was performed by a mode based on the Japan Automotive Standards Organization JASO-M609. The sample was set in the tester for testing using the CFRTP side as the evaluation surface and spraying saltwater on the evaluation surface. The corrosion resistance was evaluated by visually examining the appearance of the sample every 3 cycles up to 30 cycles (8 hours=1 cycle) and every 15 cycles from 30 cycles on and finding the number of cycles where red rust was formed. The larger the number of cycles until red rust is formed, the better the corrosion resistance and the more contact corrosion between dissimilar materials can be suppressed is shown. Further, red rust is formed near the ends of the CFRTP bonded to the metal, so the surface was visually examined focusing on these parts.

Press Formability

Using a V-shaped concave-convex die set, the V-shaped press formability by hot working in the state heating the die set to 200° C. was evaluated. A composite sample comprised of a width 50 mm×length 50 mm metal sheet on the entire surface of which CFRTP was bonded was used for the test. The die set was set and pressing performed so that the concave die side became the CFRTP surface of the composite sample while the convex die side became the metal member surface. Note that a die set with an angle of the V-part of the V-shaped die set of 90° was used. Samples were press formed using die sets of different R (radius of curvature) of the bending part to find the limit R up to which the CFRTP would not peel off. The smaller the radius of curvature at which no peeling occurs, the better the press formability. The cross-section after press forming was examined and the case where the metal sheet and CFRTP at the bonded part of the metal sheet and the CFRTP peeled apart by 30% or more with respect to the bonded part as a whole was deemed "peeling". If the case where the limit R up to which the CFRTP did not peel off is 30 mmR or less, the press formability is excellent.

As shown in Table 1, it was learned that comparing the Sample No. 11 using a cold rolled steel sheet CR for the metal sheet and provided with the resin layer and Sample No. 15 not provided with the resin layer, the metal-CFRTP composite No. 11 provided with a resin layer exhibits better corrosion resistance. Further, as shown in Tables 1 to 3, it was learned that in the same way as when using GA, GI, Zn—Al—Mg, and An—Al—Mg—Si as the metal sheet, a metal-CFRTP composite provided with a resin layer exhibits a better corrosion resistance compared with a metal-CFRTP composite not provided with a resin layer.

Sample No. 13 and Sample No. 14 are samples prepared by changing the hot press bonding temperature in the conditions for preparation of Sample No. 1. Sample No. 13 prepared by raising the hot press bonding temperature exhibited a corrosion resistance lower than Sample No. 1 and a corrosion resistance of an equal extent to No. 16 not provided with the resin layer. Sample No. 14 prepared by lowering the hot press bonding temperature had excellent corrosion resistance, but was poor in press formability.

If comparing Sample No. 1, Sample No. 2, and Sample No. 3, it was learned that compared with Sample No. 2 and Sample No. 3, Sample No. 1 was excellent in corrosion resistance. It was learned that a metal-CFRTP composite with a melting point $T_{m2}$ of the matrix resin and the melting point $T_{m1}$ of the resin layer satisfying the relationship of $T_{m2} \leq T_{m1} - 10°$ C. is greatly improved in corrosion resistance.

Sample No. 6 to No. 9 are samples prepared by changing the thickness of the resin layer in the conditions for preparation of Sample No. 1. It was learned that Sample No. 6 is lower in corrosion resistance compared with Sample No. 7 to Sample No. 9. It was learned that by making the thickness of the resin layer of a metal-CFRTP composite 5 μm or more, the corrosion resistance of the metal-CFRTP composite is greatly improved.

As explained above, the metal-CFRTP composite according to the present embodiment is excellent in corrosion resistance for contact corrosion between dissimilar materials of carbon fiber and metal and is resistance to peeling of the CFRTP and better in workability even if performing hot pressing.

Above, preferred embodiments of the present invention were explained in detail while referring to the attached drawings, but the present invention is not limited to these examples. A person having ordinary knowledge in the field of art to which the present invention belongs clearly could conceive of various modifications or corrections in the scope of the technical idea described in the claims. These are understood as naturally falling in the technical scope of the present invention.

REFERENCE SIGNS LIST 1 metal-CFRTP composite
11 metal member
12 CFRTP layer
13 resin layer
20 resin film
20A resin sheet
21 CFRTP forming prepreg
30 coating film
101 matrix resin
102 carbon fiber

The invention claimed is:

1. A metal-carbon fiber reinforced plastic composite comprising:
    a metal member of a ferrous material or ferrous alloy,
    a resin layer provided on at least one surface of said metal member and including a thermoplastic resin, and
    carbon fiber reinforced plastic provided on a surface of said resin layer and including a carbon fiber material and a matrix resin having thermoplasticity,
    wherein a melting point $T_{m1}$ of said resin layer being higher than a melting point $T_{m2}$ of said matrix resin, and
    an AC impedance at a frequency 1 Hz when immersing said metal-carbon fiber reinforced plastic composite in an aqueous solution containing sodium chloride in 5 mass % is $1 \times 10^7$ Ω or more.

2. The metal-carbon fiber reinforced plastic composite according to claim 1, wherein the thermoplastic resin contained in said resin layer is a resin different from said matrix resin.

3. The metal-carbon fiber reinforced plastic composite according to claim 1, wherein a melting point $T_{m1}$ (° C.) of said resin layer and a melting point $T_{m2}$ (° C.) of said matrix resin satisfy a relationship of the following formula (1):

$$T_{m2} \leq T_{m1} - 10° \text{ C.} \qquad \text{formula (1)}.$$

4. The metal-carbon fiber reinforced plastic composite according to claim 1, wherein a thickness of said resin layer is 5 μm or more.

5. The metal-carbon fiber reinforced plastic composite according to claim 1, wherein said ferrous material or ferrous alloy is a plated steel material provided with a galvanized layer.

6. The metal-carbon fiber reinforced plastic composite according to claim 1, wherein
    said matrix resin includes at least one thermoplastic resin selected from the group comprising phenoxys, polycarbonates, polyethylene terephthalates, polyethylene 2,6 naphthalates, nylons, polypropylenes, polyethylenes, polyepoxy ether ketones, and polyphenylene sulfides,
    the resin included in said resin layer includes at least one thermoplastic resin selected from the group comprising polycarbonates, polyethylene terephthalates, polyethylene 2,6 naphthalates, nylons, polypropylenes, polyethylenes, polyepoxy ether ketones, and polyphenylene sulfides.

7. The metal-carbon fiber reinforced plastic composite according to claim 1, wherein said matrix layer includes phenoxys.

8. A method for manufacturing the metal-carbon fiber reinforced plastic composite according to claim 1, comprising
    a step of forming a resin film including a thermoplastic resin on at least one surface of a metal member made of a ferrous material or ferrous alloy,
    a step of arranging on at least at part of a surface on which said resin film is formed a carbon fiber reinforced plastic or a carbon fiber reinforced plastic forming prepreg containing a carbon fiber material and a matrix resin including a thermoplastic resin, and
    a step of hot press bonding at a heating temperature T to form a resin layer and carbon fiber reinforced plastic layer,
    wherein said heating temperature T being less than a melting point $T_{m1}$ of said resin layer, the melting point $T_{m1}$ of said resin layer being higher than a melting point $T_{m2}$ of said matrix resin.

9. The method for manufacturing a metal-carbon fiber reinforced plastic composite according to claim 8, wherein said heating temperature T is a melting point $T_{m2}$ of said matrix resin or more.

10. A method for manufacturing the metal-carbon fiber reinforced plastic composite according to claim 1, comprising
    a step of arranging a resin sheet including a thermoplastic resin on at least one surface of a metal member made of a ferrous material or ferrous alloy,
    a step of arranging on at least at part of a surface of said resin sheet on an opposite side to said metal member a carbon fiber reinforced plastic or a carbon fiber reinforced plastic forming prepreg containing a carbon fiber material and a matrix resin including a thermoplastic resin, and
    a step of hot press bonding at a heating temperature T to form a resin layer and carbon fiber reinforced plastic layer,
    wherein said heating temperature T being less than a melting point $T_{m1}$ of said resin layer, the melting point $T_{m1}$ of said resin layer being higher than a melting point $T_{m2}$ of said matrix resin.

11. The method for manufacturing a metal-carbon fiber-reinforced plastic composite according to claim 10, wherein said heating temperature T is a melting point $T_{m2}$ of said matrix resin or more.

* * * * *